United States Patent
Pastor

Patent Number: 4,539,704
Date of Patent: Sep. 3, 1985

[54] IMAGE THINNING PROCESS

[75] Inventor: Jose Pastor, Westport, Conn.

[73] Assignee: Pitney Bowes Inc., Stamford, Conn.

[21] Appl. No.: 581,519

[22] Filed: Feb. 21, 1984

Related U.S. Application Data

[63] Continuation-in-part of Ser. No. 532,255, Sep. 15, 1983, abandoned.

[51] Int. Cl.³ .............................................. G06K 9/44
[52] U.S. Cl. ........................................ 382/55; 382/42
[58] Field of Search ............................. 382/42, 55, 56; 358/260, 133, 138; 364/728, 724

[56] References Cited

U.S. PATENT DOCUMENTS

| | | | |
|---|---|---|---|
| 3,339,179 | 8/1967 | Shelton et al. | 382/55 |
| 4,330,833 | 5/1972 | Pratt et al. | 382/42 |

OTHER PUBLICATIONS

Baier et al., "Two Dimensional Convolution Processor", *IBM Technical Disclosure Bulletin*, vol. 26, No. 9, Feb. 1984, pp. 4807-4808.

*Primary Examiner*—Leo H. Boudreau
*Assistant Examiner*—Michael M. Murray
*Attorney, Agent, or Firm*—Melvin J. Scolnick; William D. Soltow, Jr.; Albert W. Scribner

[57] ABSTRACT

A process for thinning an image, comprising the steps of defining an image in terms of a plurality of discrete picture elements (pixels), convolving each horizontal string of pixels of the image with itself shifted a predetermined number of pixels, weighting each shifted position of each horizontal string, selecting certain of the pixels of the weighted horizontally convolved pixel strings which correspond to predetermined descriptors, convolving each vertical string of pixels of the image with itself shifted a predetermined number of pixels, weighting each shifted position of each vertical string, selecting certain of the pexels of the weighted vertically convolved pixel strings which correspond to predetermined descriptors, adding thee selected pixels from the weighted vertical and horizontal convolutions and the pixels of the original image, retaining those pixels which are common to the original image and the selected pixels of both the horizontal and vertical weighted convolutions, discarding those pixels which are absent from the original image, filtering those pixels which are common to the original image and the original image and only one of the selected pixels of the horizontal and vertical weighted convolutions, further retaining certain of the filtered pixels and discarding others in accordance with a predetermined filter matrix, and providing an output signal of the retained pixels which represents a thinned image.

25 Claims, 24 Drawing Figures

FIG. 1
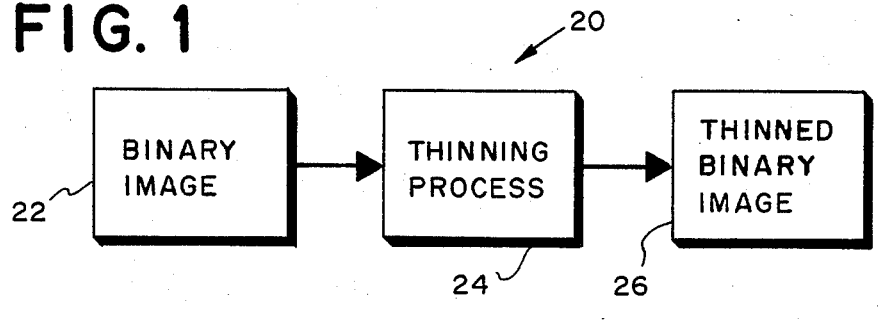
FIG. 7
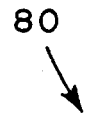
FIG. 8

|      | 0000 | 0001 | 0010 | 0011 | 0100 | 0101 | 0110 | 0111 | 1000 | 1001 | 1010 | 1011 | 1100 | 1101 | 1110 | 1111 |
|------|------|------|------|------|------|------|------|------|------|------|------|------|------|------|------|------|
| 0000 | 0 | 1 | 1 | 1 | 1 | 0 | 1 | 1 | 1 | 1 | 1 | 1 | 1 | 1 | 0 | 1 |
| 0001 | 1 | 1 | 1 | 1 | 0 | 1 | 1 | 1 | 1 | 1 | 1 | 1 | 0 | 1 | 1 | 1 |
| 0010 | 1 | 1 | 1 | 1 | 1 | 1 | 1 | 1 | 1 | 1 | 1 | 1 | 1 | 1 | 1 | 1 |
| 0011 | 1 | 1 | 1 | 1 | 1 | 1 | 1 | 1 | 0 | 1 | 1 | 1 | 0 | 1 | 1 | 1 |
| 0100 | 1 | 0 | 1 | 0 | 1 | 1 | 1 | 0 | 1 | 1 | 1 | 1 | 1 | 1 | 1 | 1 |
| 0101 | 0 | 1 | 1 | 1 | 1 | 1 | 1 | 1 | 0 | 1 | 1 | 1 | 0 | 1 | 1 | 1 |
| 0110 | 1 | 0 | 1 | 0 | 1 | 1 | 1 | 1 | 1 | 1 | 1 | 1 | 1 | 1 | 1 | 1 |
| 0111 | 0 | 0 | 1 | 1 | 1 | 1 | 1 | 1 | 0 | 1 | 1 | 1 | 0 | 1 | 1 | 1 |
| 1000 | 1 | 1 | 1 | 0 | 1 | 1 | 1 | 1 | 1 | 1 | 1 | 1 | 1 | 1 | 1 | 1 |
| 1001 | 1 | 1 | 1 | 1 | 1 | 1 | 1 | 1 | 1 | 1 | 1 | 1 | 1 | 1 | 1 | 1 |
| 1010 | 1 | 1 | 1 | 1 | 1 | 1 | 1 | 1 | 1 | 1 | 1 | 1 | 1 | 1 | 1 | 1 |
| 1011 | 1 | 1 | 1 | 1 | 1 | 1 | 1 | 1 | 1 | 1 | 1 | 1 | 1 | 1 | 1 | 1 |
| 1100 | 1 | 1 | 1 | 1 | 1 | 1 | 1 | 1 | 1 | 1 | 1 | 1 | 1 | 1 | 1 | 1 |
| 1101 | 0 | 0 | 1 | 1 | 1 | 1 | 1 | 1 | 0 | 1 | 1 | 1 | 1 | 1 | 1 | 1 |
| 1110 | 0 | 0 | 1 | 1 | 1 | 1 | 1 | 0 | 1 | 1 | 1 | 1 | 1 | 1 | 1 | 1 |
| 1111 | 0 | 0 | 1 | 0 | 1 | 1 | 1 | 1 | 0 | 0 | 1 | 1 | 1 | 1 | 1 | 1 |

L = MAXIMUM LENGTH OR WIDTH OF ANY SOLID AREA.

L = 2NK + R, R < 2N.

K IS THE NUMBER OF CONVOLUTIONS PERFORMED SO FAR.

R IS THE MAXIMUM LENGTH OR WIDTH OF ANY SOLID AREA IN THE THIN IMAGE; THINNING IS COMPLETE WHEN R = 1.

|  | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | 0 | 0 | 0 | 0 | 0 | 3 | 0 | 0 | 0 | 0 | 0 | 0 | 0 | 0 | 0 | 0 |
| 0001 | 0 | 0 | 0 | 0 | 3 | 3 | 0 | 3 | 0 | 0 | 0 | 0 | 0 | 3 | 0 | 0 |
| 0010 | 0 | 0 | 0 | 0 | 0 | 0 | 0 | 3 | 0 | 0 | 0 | 0 | 0 | 0 | 0 | 3 |
| 0011 | 0 | 0 | 0 | 0 | 0 | 0 | 0 | 3 | 0 | 0 | 0 | 0 | 0 | 0 | 0 | 0 |
| 0100 | 0 | 0 | 0 | 0 | 0 | 0 | 0 | 3 | 0 | 0 | 0 | 0 | 0 | 3 | 0 | 0 |
| 0101 | 3 | 3 | 0 | 3 | 3 | 3 | 3 | 3 | 0 | 3 | 0 | 0 | 3 | 3 | 0 | 0 |
| 0110 | 0 | 0 | 0 | 0 | 0 | 3 | 0 | 3 | 0 | 0 | 0 | 3 | 0 | 0 | 0 | 3 |
| 0111 | 0 | 3 | 3 | 3 | 3 | 3 | 3 | 3 | 0 | 0 | 0 | 0 | 0 | 0 | 0 | 0 |
| 1000 | 0 | 0 | 0 | 0 | 0 | 0 | 0 | 0 | 0 | 0 | 0 | 0 | 0 | 0 | 0 | 0 |
| 1001 | 0 | 0 | 0 | 0 | 0 | 3 | 0 | 0 | 0 | 0 | 0 | 0 | 0 | 3 | 0 | 0 |
| 1010 | 0 | 0 | 0 | 0 | 0 | 0 | 0 | 3 | 0 | 0 | 0 | 0 | 0 | 3 | 0 | 0 |
| 1011 | 0 | 0 | 0 | 0 | 0 | 0 | 3 | 3 | 0 | 0 | 0 | 0 | 0 | 3 | 0 | 0 |
| 1100 | 0 | 0 | 0 | 0 | 0 | 3 | 0 | 0 | 0 | 0 | 0 | 0 | 0 | 3 | 0 | 0 |
| 1101 | 0 | 3 | 0 | 0 | 3 | 3 | 0 | 0 | 0 | 3 | 3 | 3 | 3 | 3 | 3 | 0 |
| 1110 | 0 | 0 | 0 | 0 | 0 | 0 | 0 | 0 | 0 | 0 | 0 | 0 | 0 | 3 | 0 | 0 |
| 1111 | 0 | 0 | 3 | 0 | 0 | 0 | 3 | 0 | 0 | 0 | 0 | 0 | 0 | 0 | 0 | 0 |

| | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | 0 | 0 | 0 | 0 | 0 | 0 | 0 | 0 | 0 | 3 | 3 | 3 | 0 | 3 | 0 | 0 |
| 0001 | 0 | 3 | 3 | 3 | 0 | 0 | 0 | 0 | 0 | 3 | 3 | 3 | 0 | 0 | 0 | 0 |
| 0010 | 0 | 3 | 3 | 3 | 3 | 3 | 3 | 3 | 3 | 3 | 3 | 3 | 3 | 3 | 3 | 3 |
| 0011 | 0 | 3 | 3 | 3 | 0 | 0 | 0 | 0 | 3 | 3 | 3 | 0 | 0 | 0 | 0 | 0 |
| 0100 | 0 | 0 | 3 | 0 | 3 | 0 | 3 | 0 | 3 | 3 | 3 | 3 | 0 | 3 | 0 | 0 |
| 0101 | 0 | 0 | 3 | 0 | 0 | 0 | 0 | 0 | 0 | 3 | 0 | 0 | 0 | 3 | 0 | 0 |
| 0110 | 0 | 0 | 3 | 0 | 3 | 0 | 3 | 0 | 3 | 3 | 3 | 3 | 0 | 3 | 0 | 0 |
| 0111 | 0 | 0 | 3 | 0 | 0 | 0 | 0 | 0 | 0 | 0 | 0 | 0 | 0 | 0 | 0 | 0 |
| 1000 | 0 | 0 | 3 | 0 | 3 | 0 | 3 | 0 | 3 | 3 | 3 | 3 | 0 | 3 | 0 | 0 |
| 1001 | 3 | 3 | 3 | 3 | 3 | 0 | 3 | 0 | 3 | 3 | 3 | 3 | 0 | 3 | 0 | 0 |
| 1010 | 3 | 3 | 3 | 3 | 3 | 3 | 0 | 3 | 3 | 3 | 3 | 3 | 3 | 3 | 3 | 3 |
| 1011 | 3 | 3 | 3 | 3 | 0 | 3 | 0 | 3 | 3 | 3 | 3 | 3 | 0 | 0 | 0 | 0 |
| 1100 | 0 | 0 | 3 | 0 | 3 | 0 | 3 | 0 | 3 | 3 | 3 | 3 | 0 | 3 | 0 | 0 |
| 1101 | 3 | 0 | 3 | 0 | 0 | 0 | 0 | 0 | 0 | 3 | 0 | 0 | 0 | 0 | 0 | 0 |
| 1110 | 0 | 0 | 3 | 0 | 3 | 3 | 3 | 0 | 3 | 3 | 3 | 0 | 3 | 0 | 3 | 0 |
| 1111 | 0 | 0 | 3 | 0 | 0 | 0 | 0 | 0 | 0 | 3 | 0 | 0 | 0 | 0 | 0 | 0 |

| | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | 0 | 0 | 0 | 0 | 0 | 3 | 0 | 0 | 0 | 3 | 0 | 3 | 0 | 3 | 0 | 0 |
| 0001 | 0 | 0 | 3 | 3 | 3 | 3 | 3 | 3 | 0 | 3 | 3 | 0 | 0 | 3 | 3 | 0 |
| 0010 | 0 | 3 | 0 | 3 | 3 | 3 | 3 | 3 | 0 | 3 | 0 | 3 | 3 | 3 | 3 | 3 |
| 0011 | 0 | 3 | 3 | 3 | 3 | 3 | 3 | 3 | 0 | 3 | 3 | 0 | 3 | 3 | 3 | 3 |
| 0100 | 0 | 3 | 3 | 3 | 0 | 3 | 3 | 3 | 3 | 3 | 3 | 3 | 3 | 3 | 3 | 3 |
| 0101 | 3 | 3 | 3 | 3 | 3 | 0 | 3 | 0 | 3 | 3 | 3 | 3 | 3 | 0 | 3 | 0 |
| 0110 | 0 | 3 | 3 | 3 | 3 | 3 | 3 | 3 | 3 | 3 | 3 | 0 | 3 | 3 | 3 | 3 |
| 0111 | 0 | 3 | 3 | 3 | 3 | 0 | 3 | 3 | 3 | 3 | 3 | 3 | 0 | 0 | 3 | 0 |
| 1000 | 0 | 0 | 0 | 0 | 3 | 3 | 3 | 0 | 3 | 0 | 3 | 3 | 3 | 3 | 3 | 3 |
| 1001 | 3 | 3 | 3 | 3 | 3 | 3 | 3 | 3 | 3 | 3 | 3 | 3 | 3 | 3 | 3 | 3 |
| 1010 | 0 | 3 | 0 | 3 | 3 | 3 | 3 | 3 | 0 | 3 | 0 | 3 | 3 | 3 | 3 | 3 |
| 1011 | 3 | 0 | 3 | 3 | 3 | 3 | 3 | 3 | 3 | 3 | 3 | 3 | 3 | 3 | 3 | 3 |
| 1100 | 0 | 0 | 3 | 0 | 3 | 3 | 0 | 0 | 3 | 3 | 3 | 3 | 3 | 3 | 3 | 3 |
| 1101 | 3 | 3 | 3 | 3 | 3 | 0 | 3 | 0 | 3 | 3 | 3 | 3 | 3 | 3 | 3 | 0 |
| 1110 | 0 | 3 | 3 | 3 | 3 | 3 | 3 | 3 | 3 | 3 | 3 | 3 | 3 | 3 | 3 | 3 |
| 1111 | 0 | 0 | 3 | 3 | 3 | 0 | 3 | 0 | 3 | 3 | 3 | 3 | 3 | 0 | 3 | 0 |

| | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | C | 0 | 0 | 0 | 0 | 0 | 0 | 0 | 0 | 0 | 0 | 0 | 0 | 0 | 0 | 0 |
| 0001 | 0 | 0 | 0 | 0 | 0 | 0 | 0 | 0 | 0 | 0 | 0 | 0 | 0 | 0 | 0 | 0 |
| 0010 | 0 | 0 | 0 | 0 | 0 | 0 | 0 | 0 | 0 | 0 | 0 | 0 | 0 | 0 | 0 | 0 |
| 0011 | 0 | 0 | 0 | 0 | 0 | 0 | 3 | 0 | 0 | 0 | 0 | 0 | 0 | 0 | 0 | 0 |
| 0100 | 0 | 0 | 0 | 0 | 0 | 0 | 0 | 0 | 0 | 0 | 0 | 0 | 0 | 0 | 0 | 0 |
| 0101 | 0 | 0 | 0 | 0 | 0 | 0 | 0 | 0 | 0 | 0 | 0 | 0 | 0 | 0 | 0 | 0 |
| 0110 | 0 | 0 | 0 | 0 | 0 | 0 | 0 | 3 | 0 | 0 | 0 | 0 | 0 | 0 | 0 | 0 |
| 0111 | 0 | 0 | 0 | 3 | 0 | 0 | 3 | 0 | 0 | 0 | 0 | 0 | 0 | 0 | 0 | 0 |
| 1000 | 0 | 0 | 0 | 0 | 0 | 0 | 0 | 0 | 0 | 0 | 0 | 0 | 0 | 0 | 0 | 0 |
| 1001 | 0 | 0 | 0 | 0 | 0 | 0 | 0 | 0 | 0 | 0 | 0 | 0 | 3 | 0 | 0 | 0 |
| 1010 | 0 | 0 | 0 | 0 | 0 | 0 | 0 | 0 | 0 | 0 | 0 | 0 | 0 | 0 | 0 | 0 |
| 1011 | 0 | 0 | 0 | 0 | 0 | 0 | 0 | 0 | 0 | 0 | 0 | 0 | 0 | 0 | 0 | 0 |
| 1100 | 0 | 0 | 0 | 0 | 0 | 0 | 0 | 0 | 0 | 0 | 0 | 0 | 3 | 0 | 0 | 0 |
| 1101 | 0 | 0 | 0 | 0 | 0 | 0 | 0 | 0 | 3 | 0 | 0 | 3 | 0 | 0 | 0 | 0 |
| 1110 | 0 | 0 | 0 | 0 | 0 | 0 | 0 | 0 | 0 | 0 | 0 | 0 | 0 | 0 | 0 | 0 |
| 1111 | 0 | 0 | 0 | 0 | 0 | 0 | 0 | 0 | 0 | 0 | 0 | 0 | 0 | 0 | 0 | 0 |

IMAGE THINNING PROCESS

CROSS-REFERENCE TO RELATED APPLICATIONS

This application is a continuation-in-part of copending application Ser. No. 532,255, filed on Sept. 15, 1983, now abandoned, in the name of Dr. Jose Pastor, entitled, IMAGE THINNING PROCESS.

PROGRAM APPENDIX

Attached to the last page of the Specification are program listings in CHIPS Language for implementing the process of the present invention with an image processor, such as available from Gould DeAnza. A conventional pre-processing feature designated PRELUT is used in the listings to smooth out the rough edges of the binary image.

BACKGROUND OF THE INVENTION

The present invention relates to image preprocessing, and more specifically to an image thinning process.

Typically, after a character is scanned and the features to be analyzed are detected, the detected image (characters for an OCR machine) is compared with a mask stored in memory for recognition. If there is sufficient correspondence between the detected image and the mask, the character is recognized. However, it has long been recognized as desirable to find the skeleton of an image during image preprocessing to facilitate computer interpretation of images in optical character recognition and robotic systems. Present thinning techniques first require detection and isolation of the entire character prior to thinning. See, for example, U.S. Pat. No. 3,846,754, issued to Oka et al. on Nov. 5, 1974; U.S. Pat. No. 3,940,737, issued to Beun on Feb. 24, 1976; U.S. Pat. No. 3,975,709, issued to Beun et al. on Aug. 17, 1976; U.S. Pat. No. 4,034,344, issued to Savaga et al. on July 5, 1977; U.S. Pat. No. 4,115,760 issued to Ito on Sept. 19, 1978; and U.S. Pat. No. 4,162,482, issued to Su on July 24, 1979. Thereafter, complicated computations are performed on the detected image including finding edge gradients, chordal distances, etc. to find the skeleton of the image. With such techniques, one of the advantages of thinning, i.e., helping with line finding and the segmentation of lines into characters, is not used.

U.S. Pat. No. 3,339,179 issued to Shelton, Jr., et al. on Aug. 29, 1967 discloses an image thinning technique based on eliminating all the pixels not necessary for connectivity. Specifically, a pattern is obtained by iteratively operating on the pattern to be identified with an incidence matrix. The result of operating on the input pattern by the incidence matrix is to generate an output pattern having a ridge of relatively high values along the center and lower values on either side of the ridge. Intersection points and end points are also determinable by the relative amplitudes of the values along the ridges. Such a thinning technique is not deterministic or universally applicable, but requires adjustments in the preservation values for different characters, e.g., by adjusting a potentiometer.

SUMMARY OF THE INVENTION

It is an object of the present invention to provide an improved image thinning process.

It is a further object of the present invention to provide an image thinning process which results in a thinned image which is more easily recognized.

It is a further object of the present invention to provide an image thinning process which facilitates line finding and segmentation of the images in optical character recognition machines.

It is a still further object of the present invention to provide an image thinning process which facilitates definition of the resulting thinned image in vector space.

It is still a further object of the present invention to provide an improved image thinning process which facilitate character recognition and therefore facsimile transmission.

It is a still further object of the present invention to provide an improved image thinning process which overcomes the disadvantages of prior image thinning processes.

Briefly, in accordance with the present invention, a process is disclosed for thinning an image, comprising the steps of defining an image in terms of a plurality of discrete picture elements (pixels), convolving each horizontal string of pixels of the image with itself shifted a predetermined number of pixels, weighting each shifted position of each horizontal string, selecting certain of the pixels of the weighted horizontally convolved pixel strings which correspond to predetermined descriptors, convolving each vertical string of pixels of the image with itself shifted a predetermined number of pixels, weighting each shifted position of each vertical string, selecting certain of the pixels of the weighted vertically convolved pixel strings which correspond to predetermined descriptors, adding the selected pixels from the weighted vertical and horizontal convolutions and the pixels of the original image, retaining those pixels which are common to the original image and the selected pixels of both the horizontal and vertical weighted convolutions, discarding those pixels which are absent from the original image, filtering those pixels which are common to the original image and the original image and only one of the selected pixels of the horizontal and vertical weighted convolutions, further retaining certain of the filtered pixels and discarding others in accordance with a predetermined filter matrix, and providing an output signal of the retained pixels which represent a thinned image.

Other objects, aspects and advantages of the present invention will be apparent from the detailed description considered in conjunction with the drawings, as follows:

BRIEF DESCRIPTION OF THE DRAWINGS

FIG. 1 is a schematic view of a generalized system for performing the image thinning process of the present invention;

FIG. 7 illustrates a matrix neighborhood for forming a binary filter about each contingent pixel for determining whether the pixel is to be preserved or discarded;

FIG. 8 illustrates the matrix neighborhood with reassigned binary values;

FIG. 14 is an anorexic matrix filter for eliminating overlapping pixels of portions of the thinned image shown in FIG. 12;

FIG. 16 illustrates another filter matrix for application to pixels of value 1;

FIG. 17 illustrates another filter matrix for application to pixels of value 2 if there are pixels of value 3 present in its 3×3 neighborhood;

FIG. 18 illustrates another filter matrix for application to pixels of value 2 if there are pixels of value 3 present in its 3×3 neighborhood;

FIG. 19 illustrates another filter matrix for application to pixels of value 2 if there are no pixels of value 3 or 2 present in the neighborhood;

DETAILED DESCRIPTION

Referring to FIG. 1, a system for employing the process of the present invention, e.g., on a digital computer, is generally illustrated as 20. Binary image pulses 22 are supplied to a digital computer which is programmed to accomplish the thinning process 24, e.g., in accordance with the Program in the Appendix and flowcharts illustrated in FIGS. 15, 20, or 21, as desired. The output in the form of the binary thinned image 26 may be displayed on a CRT display, as desired.

Figure 2A:
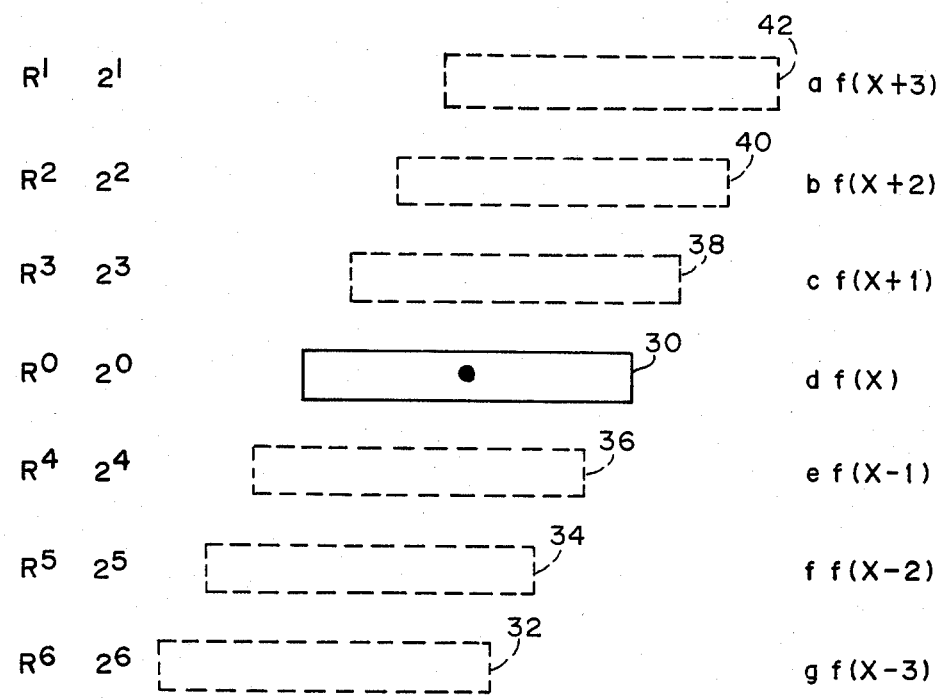
FIG. 2A is a schematic representation of the horizontal convolution of a pixel string of seven (7) pixels.
Figure 2A:
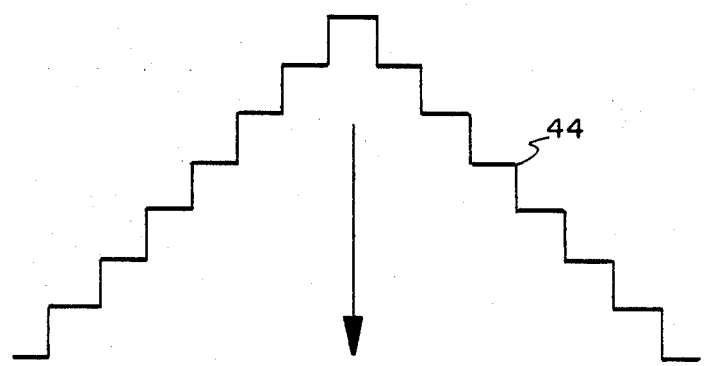
Figure 2A:
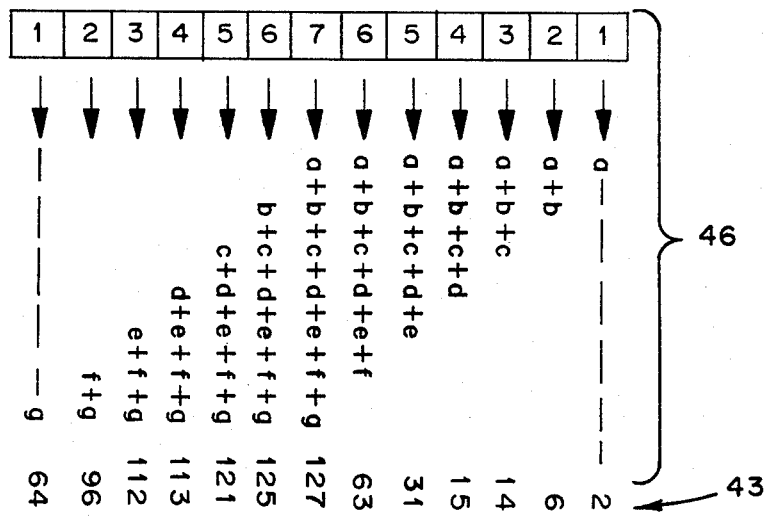

Referring to FIG. 2A, a seven (7) element horizontal pixel string of an image is illustrated at 30. The convolution $$\sum_{i=-3}^{i=+3} f(x + i)$$

is performed to find the center of the pixel string 30 by shifting the axis of the horizontal pixel string 30 with itself by three (3) pixels and adding the results. That is, the horizontal pixel string is convolved with a Dirac comb. The function f(x−3) is designated 32, the functions f (x−2) is designated 34, the function f(x−1) is designated 36, the function f(x) is designated 30, the function f (x+1) is designated 38, the function f (x+2) is designated 40, and the function f (x+3) is designated 42. Additionally, f (x+3), f (x+2), f (x+1), f (x), f (x−1), f (x−2) and (x−3) are multiplied by the weighting factors a, b, c, d, e, f and g, respectively. The convolution which results from adding the functions f (x±i) is designated 44 in FIG. 2A.

Advantageously, each horizontal pixel position of the resulting convolution 44 has a value which results from adding the weights for each function. In this way a weighted horizontal map 46 is provided for each horizontal pixel position resulting from the horizontal convolution 44. Moreover, significantly, by utilizing the weighting factors the horizontal pixel position of the convolution 44 is readily weighted. For example, reading the horizontal map 46 from right to left in FIG. 2A, the first position is assigned the number 1 (representing 1 pixel) and the weighting factor a, the second position the number 2 (representing 2 pixels) and the weighting factor a+b, the third position the number 3 (representing 3 pixels) and the weighting factor a+b+c, the fourth position the number 4 (representing 4 pixels) and the weighting factor a+b+c+d, the fifth position the number 5 (representing 5 pixels) and the weighting factor a+b+c+d+e, the sixth position the number 6 (representing 6 pixels) and the weighting factor a+b+c+d+e+f, the seventh position the number 7 (representing 7 pixels) and the weighting factor a+b+c+d+e+f+g, the eighth position the number 6 (representing 6 pixels) and the weighting factor b+c+d+e+f+g, the ninth position the number 5 (representing 5 pixels) and the weighting factor c+d+e+f+g, the tenth position the number 4 (representing 4 pixels) and the weighting factor d+e+f+g, the eleventh position the number 3 (representing 3 pixels) and the weighting factor e+f+g, the twelveth position the number 2 (representing 2 pixels) and the weighting factor f+g, and thirteenth position the number 1 (representing 1 pixel) and the weighting factor g.

Figure 2B:
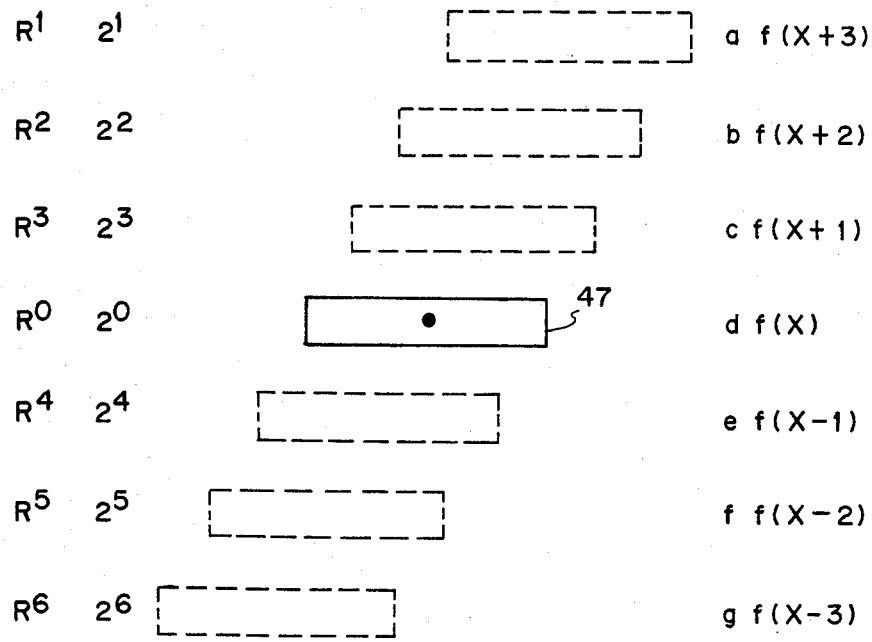
FIG. 2B is a schematic representation of the horizontal convolution of a pixel string of five (5) pixels.
Figure 2B:
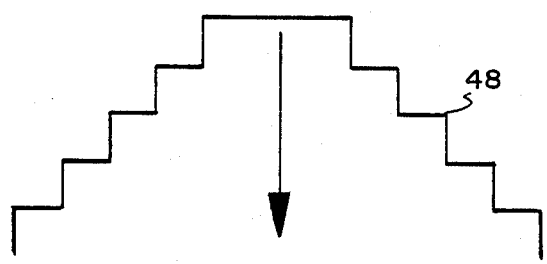
Figure 2B:
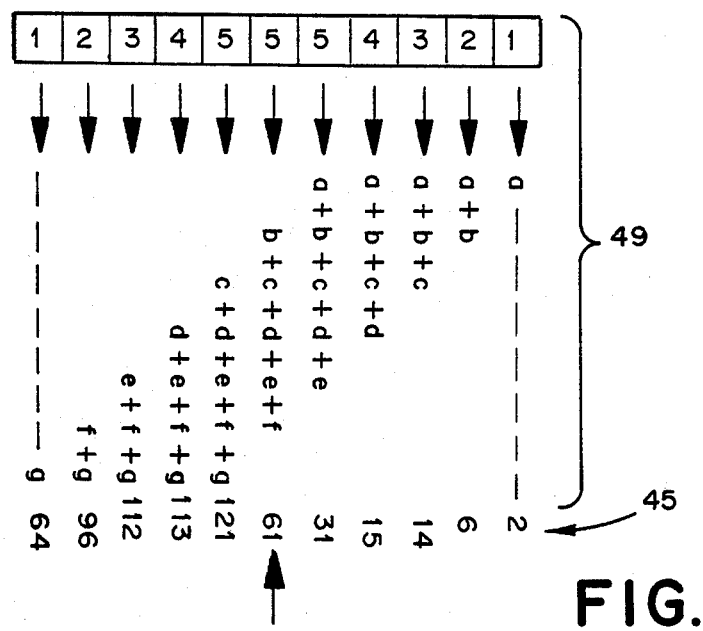

Referring to FIG. 2B, a five (5) element horizontal pixel string of an image is illustrated at 47. As with FIG. 2A the convolution $$\sum_{i=-3}^{i=+3} f(x + i)$$

is performed to find the center of the pixel string 47 by shifting the axis of the horizontal pixel string 47 with itself by three (3) pixels and adding the results. The resulting convolution is designated 48 and its associated weighted horizontal map is designated 49. As with each horizontal pixel position in FIG. 2A, each horizontal pixel position of the convolution in FIG. 2B has a value which results from adding the weights for each function as seen at 49.

In assigning values to the pixels, the centers of the strings can be readily determined if the weighting factors are such that they produce for each weighted pixel a different value. Advantageously, this is achieved by defining the weights as powers of a number R, i.e., $R^1$, $R^2$, $R^3$, $R^0$, $R^4$, $R^5$, $R^6$, as shown in FIGS. 2A and 2B for the example of a ±3 convolution. As a result, the values of the pixels are all different numbers in base R. Very advantageously, the base 2 may be used to facilitate implementation with digital electronics. Therefore, preferably R becomes a 2 as illustrated in FIGS. 2A and 2B and the resulting values of the horizontal pixel positions are designated as 43 and 45, respectively.

Thus, in the binary system moving from right to left the values for the pixels are indicated in FIGS. 2A and 2B. The values that correspond to the centers are the descriptors indicated by the arrows whose formulation is discussed in detail below. The pixels having a value equal to these descriptors are preserved and all the other pixels eliminated. Thus, the centers of all the horizontal pixel strings, and similarly the centers of all the vertical pixel strings are determined. Thus, each center pixel of odd pixel strings and both center pixels of even pixel strings are uniquely described in binary digits. Moreover, it is apparent that each center pixel will always be described by an odd number or descriptor in decimal numbers.

It should be understood that although horizontal pixel strings of 7 and 5 pixels are illustrated in FIGS. 2A and 2B, respectively, the horizontal and vertical pixel strings of an image can, and normally will, include varying numbers of pixels. Further, it should also be apparent from FIGS. 2A and 2B that the maximum number of pixels eliminated from a pixel string undergoing a 3×3 convolution is equal to 5 pixels. Therefore, for long pixel strings additional convolutions may be applied to the resulting pixel strings, as desired.

In addition to preserving the descriptors for the center pixels of the pixel string, it is desired to preserve already short strings of pixels, e.g., those having only one or two pixels, to preserve voids in a pixel string, i.e., separations between characters, and prevent any artificial breaks in the resulting thinned image. To generalize from the illustration and description of FIGS. 2A and 2B, this is accomplished by a Weighted Convolution defined as $$WC = \sum_{i=-k}^{i=+k} a_i f(x + i)$$

where the selection of the $2k+1$ pixels coefficients $a_i$ finds the center for images up to $2k+1$ pixels in length, the central plateau for strings longer than $2k+1$ pixels, and preserves the already thin lines and the voids (character separations) in the strings of pixels.

Assume $k=2$ and that there are six pixel strings having lengths of 1, 2, 3, 4, 5 and 6 pixels. If $a_{-2}=a$, $a_{-1}=b$, $a_0=c$, $a_1=d$ and $a_2=e$, the coefficients are selected to satisfy the following conditions:

For the string of one pixel $c \neq $ other $C_5^1$, $C_5^2$, $C_5^3$, $C_5^4$, $C_5^5$ For the string of two pixels $a+b \neq C_5^1$, other $C_5^2$, $C_5^3$, $C_5^4$, $C_5^5$ For the string of three pixels $b+c+d \neq C_5^1$, $C_5^2$, other $C_5^3$, $C_5^4$, $C_5^5$ For the string of four pixels $a+b+c+d \neq C_5^1$, $C_5^2$, $C_5^3$, other $C_5^4$, $C_5^5$ For the string of five or more pixels $a+b+c+d+e \neq C_5^1$, $C_5^2$, $C_5^3$, $C_5^4$, other $C_5^5$ $c_5^i$ represents the addition of the numbers $a_i$ in the combinations of order i with 5 elements (a, b, c, d, and e). The solution to this set of conditions locates the centers of pixel strings up to $2k+1$ pixels in length and the center plateau for pixel strings having a length greater than $2k+1$.

For any k, this approach can be generalized. As previously described with reference to FIGS. 2A and 2B, the coefficients are $a_0=1$ and the other power of a particular base in ascending order. Advantageously, when powers of 2 are utilized the coefficients are as follows:

| | | |
|---|---|---|
| For k = 2: | $a_{-2} = 2^1$ | For k = 4: $a_{-4} = 2^1$ |
| | $a_{-1} = 2^2$ | $a_{-3} = 2^2$ |
| | $a_0 = 1$ | $a_{-2} = 2^3$ |
| | $a_1 = 2^3$ | $a_{-1} = 2^4$ |
| | $a_2 = 2^4$ | $a_0 = 1$ |
| | | $a_1 = 2^5$ |
| For k = 3: | $a_{-3} = 2^1$ | $a_2 = 2^6$ |
| | $a_{-2} = 2^2$ | $a_3 = 2^7$ |
| | $a_{-1} = 2^3$ | $a_4 = 2^8$ |
| | $a_0 = 1$ | |
| | $a_1 = 2^4$ | etc. for larger ks. |
| | $a_2 = 2^5$ | |
| | $a_3 = 2^6$ | |

Further, by defining the coefficients in this manner, it is apparent that what results are 5 bit, 7 bit, 9 bit, etc. binary numbers.

The weighted convolution (WC) is then compared with a one-dimensional matrix of preservation values or descriptors $D_i$ as described above. Pixels of value $D_i$ are assigned the value 1 and all others the value 0.

For $k=3$, the center descriptors to preserve for strings of 1, 2, 3, 4, 5, 6 and 7 pixels are 1, 3, 5, 7, 9, 11, 25, 27, 29, 33, 35, 37, 39, 41, 43, 59, 61, 63, 65, 67, 69, 71, 73, 89, 91, 93, 95, 97, 99, 101, 105, 107, and 127. The descriptors 1, 9, 25, 29, 61, 63 and 127 define the center pixel for the seven isolated strings of pixels. The other descriptors preserve the center pixels for the same strings when they are adjacent to other strings and separated by only one (1) or two (2) pixels. For an N×N convolution, adjacent strings separated by N or more pixels do not intrude to change the center descriptors.

Figure 3:
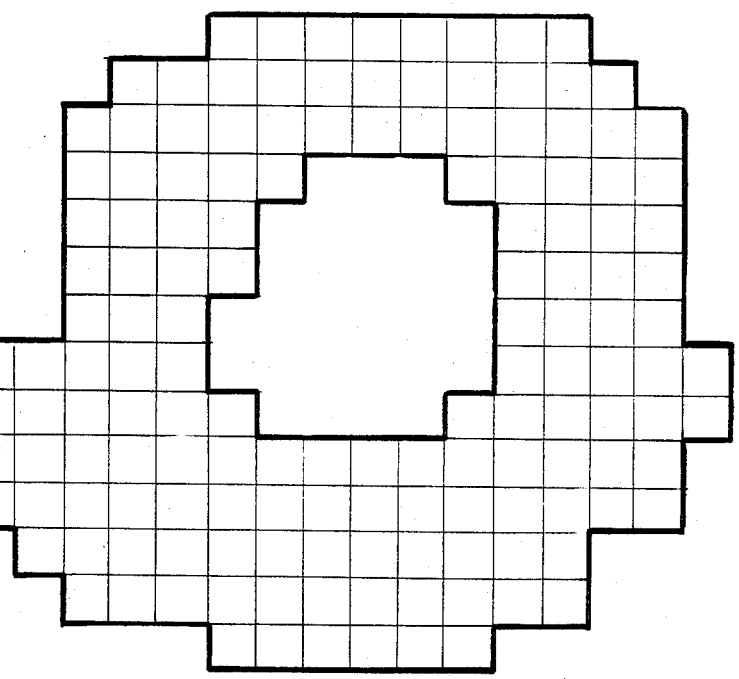
FIG. 3 is a plan view of a typical image, shown as the alphanumeric character six (6)

Referring to FIG. 3, a two dimensional image in the form of alphanumeric character six (6) is designated 50. Thinning of the image 50 in accordance with the present invention is accomplished by digitizing the same and performing a weighted horizontal convolution $$WHC = \sum_{i=-k}^{i=+k} a_i f(x + i, y).$$

The resulting convolution is then compared with the matrix $D_i$ to determine the horizontal pixels to be preserved. The pixels to be preserved result in the shaded binary image 52 illustrated in dotted outline in FIG. 4. The specific horizontal pixels 54 to be preserved are shaded for clarity and superimposed over the original image 50. Next, the weighted vertical convolution $$WVC = \sum_{i=-k}^{i=+k} a_i f(x, y + i)$$

is performed and compared with the matrix $D_i$ to determine the vertical pixels to be preserved. The result is the shaded binary image 56 illustrated in dotted outline in FIG. 5. The specific vertical pixels 58 to be preserved are shaded for clarity and superimposed over the original image 50.

Figure 4:
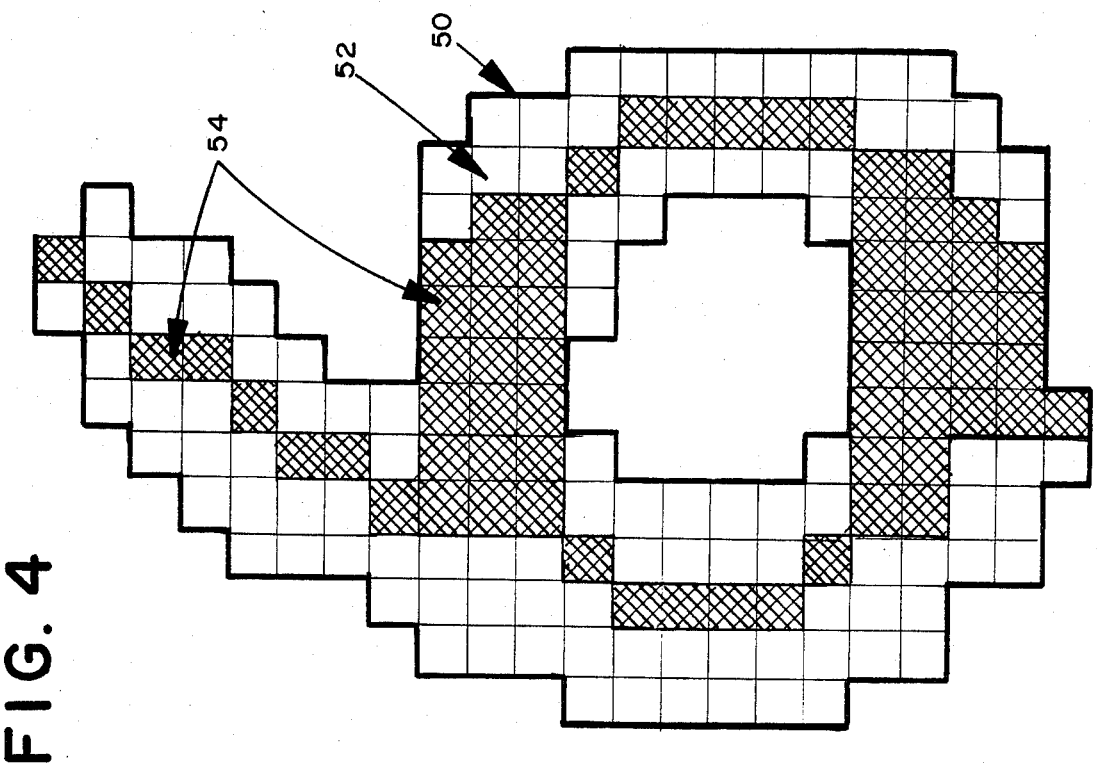
FIG. 4 is a plan view of a weighted horizontal convolution for the horizontal pixel strings of the image of FIG. 3 with the retained pixels shaded for clarity.
Figure 6:
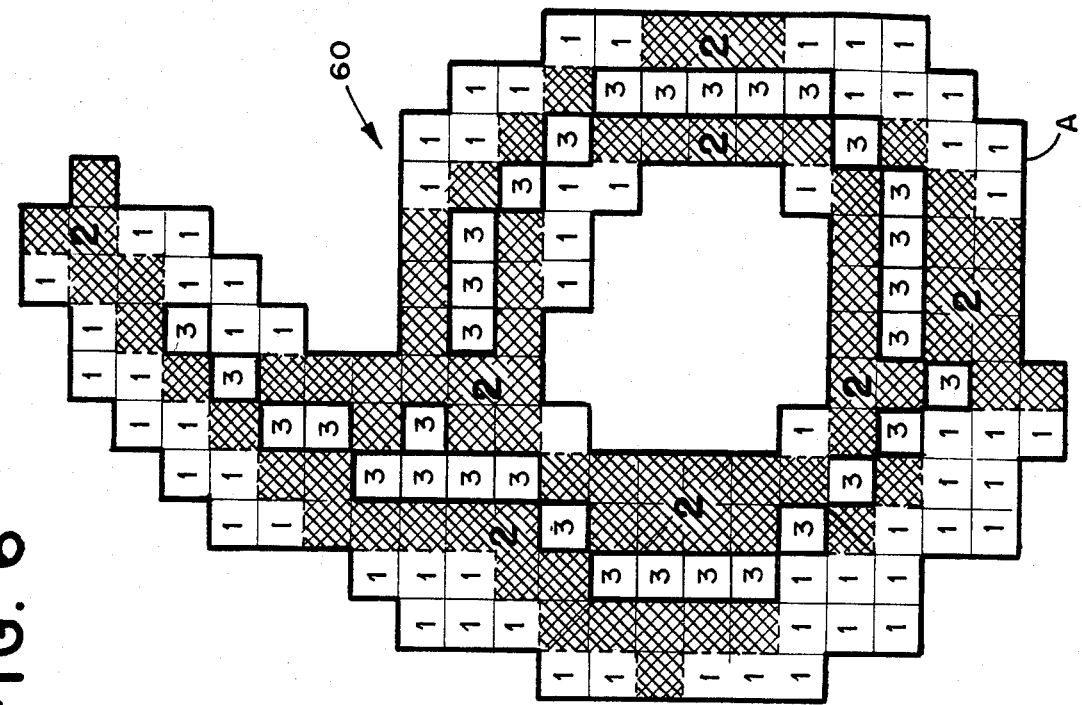
FIG. 6 is a composite image formed by summing pixel elements from the images of FIGS. 3, 4 and 5.
Figure 5:
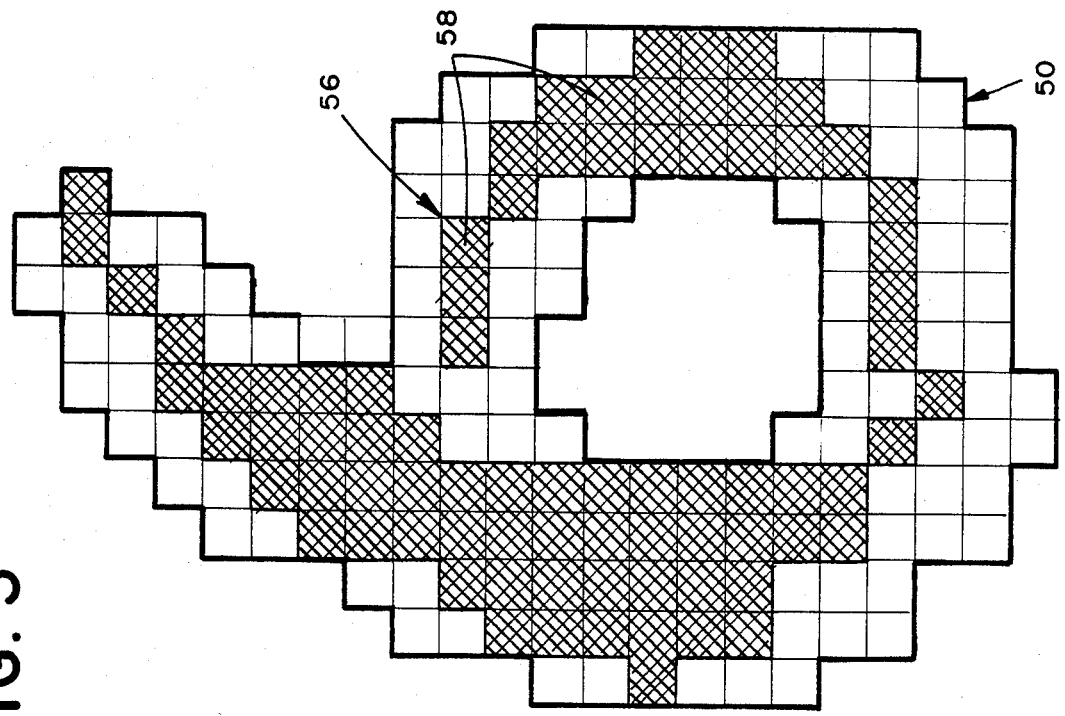
FIG. 5 is a plan view of a weighted vertical convolution for the vertical pixel strings of the image of FIG. 3 with the retained pixels shaded for clarity.

A composite image can now be formed, as illustrated in FIG. 6, by overlaying the original image 50 of FIG. 3 with the selected pixels from the weighted horizontal convolution 52 of FIG. 4 and the weighted vertical convolution 56 of FIG. 5. The resulting image 60 is composed of pixels which are assigned four distinct value or levels: 0, 1, 2 and 3. Pixels assigned a value of 0 are not part of the original image and remain 0. Pixels assigned a value of 3 are common to the original image of FIG. 3, and both the preserved pixels of the weighted horizontal convolution of FIG. 4 and the preserved pixels of the weighted vertical convolution of FIG. 5. Therefore, pixels of value 3 definitely belong to the thinned image or skeleton. Pixels of value 2 are common to the original image and only one of the selected pixels of the weighted horizontal or vertical convolutions, i.e., FIG. 4 or 5. Pixels of value 1 are only common to the original image, see FIG. 3.

The composite image 60 is now filtered. The pixels of value 3 are preserved, the pixels of value 0 are discarded. The skeleton of the image 50 is then rebuilt with pixels of value 3 and predetermined pixels of value 1 and 2. That is, some of the pixels of value 1 and 2 are preserved, while others are eliminated. To accomplish this, a 3×3 neighborhood is applied to each pixel of value 1 or 2. In accordance with a selection rule, that pixel is discarded or made either a 3 (preserved) or a 2 (contingent). It is made a 3 if it is to be part of the skeleton and a 2 if the decision is conditional. Once the filter is applied, all the remaining pixels will have a value of 2 or 3. The filter is applied again to the pixels of value 2 and either all the pixels of value 2 are eliminated, converted to 3s, or a very few 2s remain. The filter is then applied to the pixels of value 2 again. For a 3×3 convolution, preferably the filter is applied 3 consecutive times.

Referring to the pixel designated A in FIG. 6, a 3×3 neighborhood is applied thereto as shown in FIG. 7 as 70. The pixels of this neighborhood are binarized resulting in the neighborhood 80 illustrated in FIG. 8. That is, pixels of value 0 are assigned the value zero. Pixels of value 1, 2 or 3 are assigned the value 1.

Figures 9, 10:
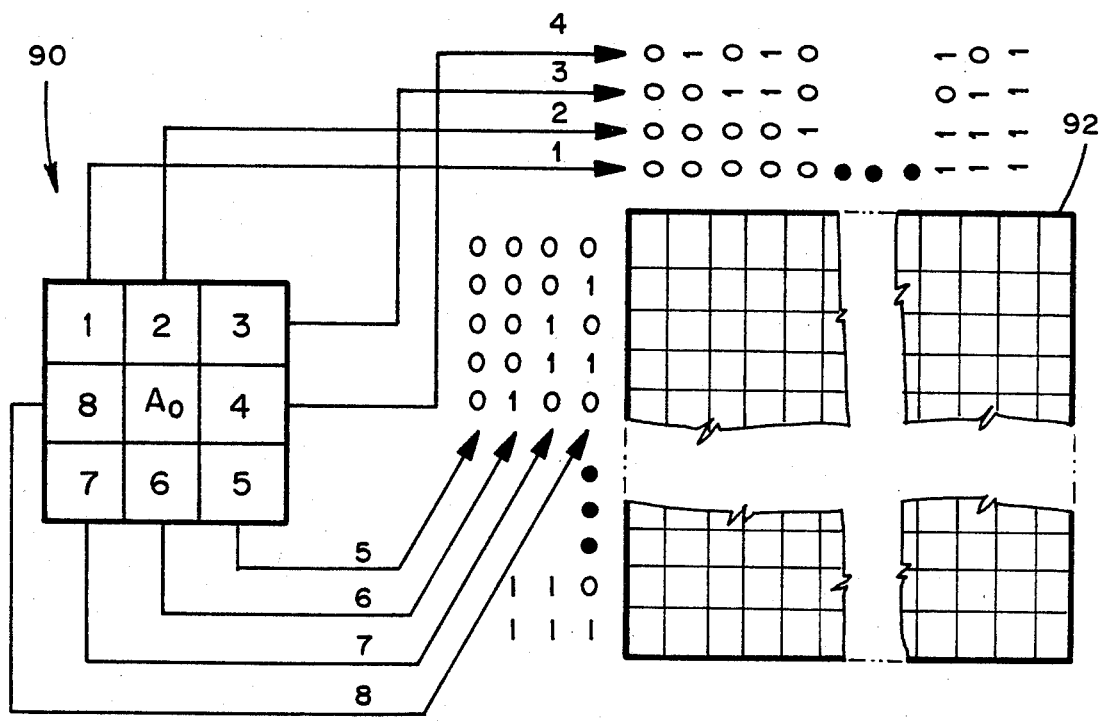
FIG. 9 illustrates how the matrix filter is prepared from the matrix neighborhoods of FIGS. 7 and 8.
FIG. 10 illustrates a completed matrix filter with assigned values for the matrix neighborhoods.

Referring to FIG. 9, advantageously, the pixels of the neighborhood 90 are formed into all combinations of two (2) four bit numbers or nibbles as shown in the double entry table or filter matrix 92 of FIG. 9. Each neighborhood 90, as illustrated in FIG. 9, has pixels 1–4 assigned to a specific nibble along the horizontal axis of the double entry table 92 and pixels 5–8 assigned to a specific nibble along the vertical axis of the double entry table 92 to form a filter matrix for each pixel of the convolved composite image 60 of FIG. 6. The nibbles and specific values corresponding to the nibbles are set forth in the filter matrix illustrated as 100 in FIG. 10. For example, with regard to the pixel A in FIG. 6, the value assigned to this pixel in the filter matrix of FIG. 10, for the horizontal nibble 1110 and the vertical nibble of 0001, is 0. That is, pixel A is discarded.

In deriving the filter matrix 100 of FIG. 10, all pixels of value 1 are eliminated except: a. Those that will produce a break in the image; they are made 3, and b. Those pixels that are immersed in a full 3×3 neighborhood are made 2. From the pixels of value 2, those pixels are preserved which would produce a break if eliminated. Instead of defining a mathematical algorithm in terms of 4 and 8 connectivities, all 256 cases ($2^8$) have been analyzed one by one to define the filter matrix 100. However, as seen in the first program listing in th Program Appendix two different filter matrices have been utilized in the Image Thinning Process. The second filter matrix is actually the filter matrix 100. However, preferably, these two filter matrices are combined to form the single filter matrix 100.

Figure 11:
FIG. 11 shows an original image, illustrated as the alphanumeric characters zero (0), six (6) and eight (8)
Figure 11:
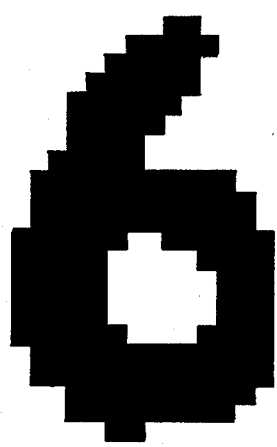
Figure 11:
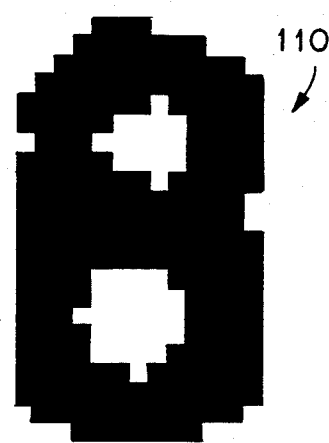

FIG. 11 illustrates an original image 110 in the form of the alphanumeric characters 068. The result obtained by subjecting the image 110 of FIG. 11 to the thinning process in accordance with the present invention is the thinned alphanumeric characters 068, illustrated in FIG. 12 as 120.

The foregoing discussion has focused on 2×2 and 3×3 convolutions by way of example. However, it should be understood that the convolution N×N may be any integer. Instead of a horizontal convolution of 3 right and 3 left, and a vertical convolution of 3 up and 3 down for individual pixel strings, the convolution may be generalized to N right and N left, and N up and N down. The total numbers to preserve as descriptors of the centers of the pixel strings are as follows: $TD = 2^{2N-1} + 1$.

| N × N convolution | Total Numbers = 2 | 2N + 1 Total Numbers to Preserve = TD |
|---|---|---|
| 2 × 2 | 32 | 9 |
| 3 × 3 | 128 | 33 |
| 4 × 4 | 512 | 129 |
| 5 × 5 | 2048 | 513 |

Moreover, it is desirable to differentiate between right and left center pixels for strings of even numbers of pixels in which two center pixels are present. The descriptors to preserve are defined as follows:

For strings of odd numbers of pixels $L = 2j+1$ $j = 0 \ldots (N-1)$ Preserve descriptors $D_1, \ldots D_{2j+1}$ $$D_1(j=0) = 1 + 2p + 2^{N+j+2}q$$

$$p = 0,1,2 \ldots \binom{2^{N-j'}-1}{-1}$$

$$j' = j \text{ to } N - 1$$

$$q = 0,1,2 \ldots \binom{2^{N-j''}-1}{-1}$$

$$j'' = j \text{ to } N - 1$$

$$D_{2j+1}(j>0) = 1 + \sum_{i=-(j-1)}^{i=j} 2^{N+i} + 2p + 2^{N+j+2}q$$

$$p = 0,1,2 \ldots \binom{2^{N-j'}-1}{-1}$$

$$j' = j \text{ to } (N - 1)$$

$$q = 0,1,2 \ldots \binom{2^{N-j''}-1}{-1}$$

$$j'' = j \text{ to } (N - 1)$$

For even strings $L = 2k$ $k = 1,2 \ldots N$ $$D_k \text{ Right} = 1 + \sum_{i=-(k-1)}^{i=k-1} 2^{N+i} + 2p + \binom{2^{N+k+1}}{q}$$

$$p = 0,1,2 \ldots \binom{2^{N-k'}-1}{-1}$$

$$k' = k \text{ to } (N - 1)$$

-continued $$q = 0,1,2 \ldots \binom{2^{N-k''}-1}{-1}$$

$$k'' = k \text{ to } N$$

$$D_k \text{ Left} = 1 + \sum_{i=-(k-2)}^{i=k} 2^{N+i} + 2p + 2^{N+k+2}q$$

$$p = 0,1,2 \ldots 2^{N-k'}_{-1}$$

$$k' = k \text{ to } N$$

$$q = 0,1,2 \ldots \binom{2^{N-k''}-1}{-1}$$

$$k'' = k \text{ to } (N-1)$$

Thus, the total numbers to be preserved are:

$$T = (\text{all } \#j = 0) + \text{all } (\#j > 0) + \begin{array}{c}(\text{all } D_k \text{ Right}) \\ \text{or} \\ (\text{all } D_k \text{ Left})\end{array}$$

If both $D_k$ Right and $D_k$ Left are preserved, the centers of even strings of pixels will be defined by two pixels. However, by preserving only $D_k$ Right or $D_k$ Left, advantageously the center of each even string of pixels is defined by only one pixel. Further, if only the right side pixels or the left side pixels are preserved, certain thinned images, specifically, those that are originally very thick and require the successive application of the convolution more than once may be biased to one side. Therefore, as desired, the weighted convolutions performed on an image may alternate between $D_k$ Right and $D_k$ Left. Moreover, to prevent holes or breaks in the thinned image, pixel strings having a length of two pixels are preserved without thinning. To accomplish this for a 3×3 convolution, the center descriptors for Left side thinning $D_k$ Left for two pixel strings are added to the center descriptors for the Right side thinning $D_k$ Right.

For a 3×3 weighted convolution, the descriptors to be preserved are:

1, 3, 5, 7, 9, 11, [17, 19, 21, 23] 25, 27, 29, 33, 35, 37, 39, 41, 43, [57, 59], 61, 63, 65, 67, 69, 71, 73, 75, 81, 83, 85, 87, 89, 91, 93, 97, 99, 101, 103, 105, 107, [125], 127.

The numbers inside the brackets represent the additional descriptors from Left side thinning $D_k$ Left.

Further, although the prior discussions have focused on N×N convolutions, i.e., a square for the convolution kernel, it may be advantageous to convolve with a rectangle M×N where M≠N. This may be advantageous for increasing speed or where an image is already thinner in one direction, e.g., the vertical direction. For M=3 and N=2, the horizontal center descriptors are as previously indicated and the vertical center descriptors are reduced to 1, 3, 5, 9, 11, 13, 15, 17, 19, 21, 29 and 31.

Figure 12:
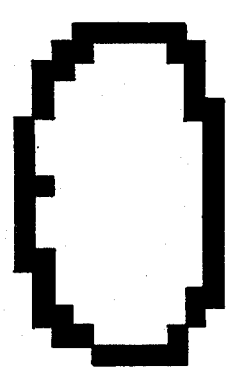
FIG. 12 shows the thinned image which results when the image of FIG. 11 is convolved and filtered with the matrix filter of FIG. 10.
Figure 12:
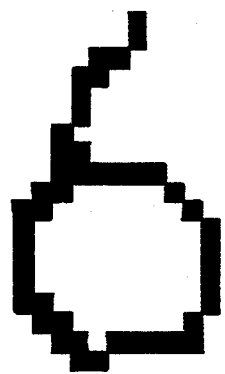
Figure 12:
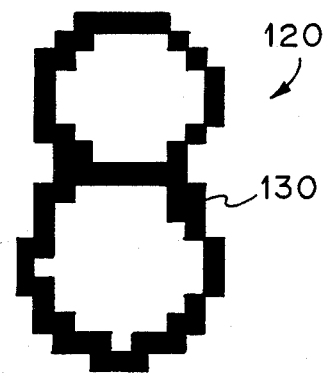

To provide further image thinning for maximum data compression and recognition algorithms, it is desirable to eliminate any line connections having more than one pixel, i.e., the overlapping of lines. This overlapping is due to the fact that strings of two pixels are retained as already thin because for such strings there is no center pixel. As seen in FIG. 12, a portion of the resulting thinned image may include overlapping connecting lines such as 130. It is advantageous for the reasons mentioned to eliminate such overlapping or double connecting lines 130 resulting in single connecting lines 140 as illustrated in the further thinned image 150 of FIG. 13.

Figure 13:
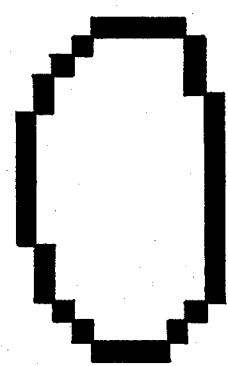
FIG. 13 shows a still thinner image which results when the thinned image of FIG. 12 is further filtered with an anorexic matrix filter.
Figure 13:
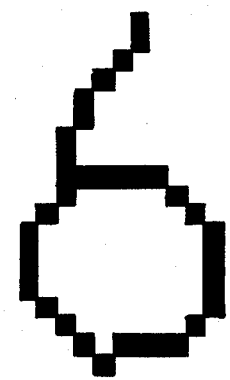
Figure 13:
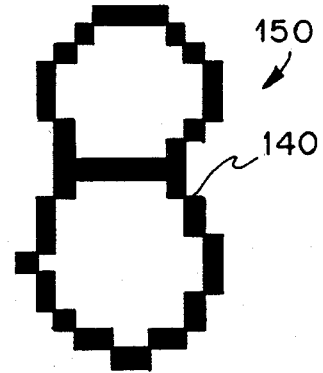

To accomplish this further thinning, double connections of the resulting thinned image, such as seen in FIG. 12, are eliminated to produce the lines such as 140 illustrated in FIG. 13. Resulting lines at an angle of 45°, greater than 45°, or less than 45° are all thinned as seen in FIG. 13.

Referring to FIG. 14, this further thinning is accomplished with a non-symmetric anorexic matrix filter or double entry table 190 which may be advantageously applied to each pixel of the thinned image of FIG. 12. The anorexic matrix filter 190 is constructed from pixel neighborhoods in a manner similar to the construction of the matrix filter 100 of FIG. 10, with the precaution that breaks must be avoided. This means that either left and up pixels are eliminated and right and down pixels are preserved, or vice versa, but not both. Therefore, FIG. 14 is only illustrative of one possible anorexic filter.

Figure 15A:
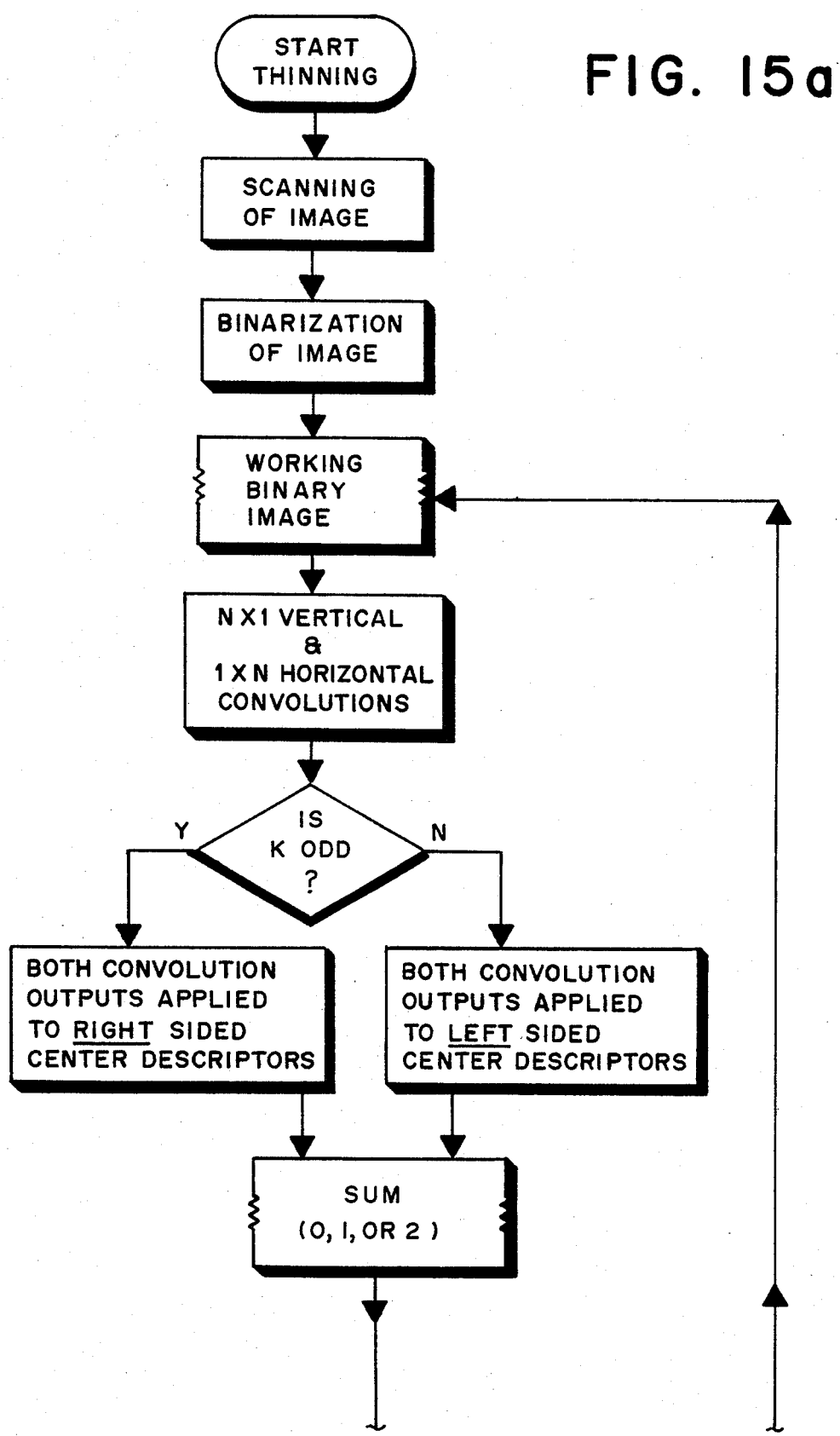
FIG. 15a-c, is a flowchart for implementing the process of the present invention on a digital computer with a matrix filter of the type illustrated in FIG. 10.
Figure 15B:
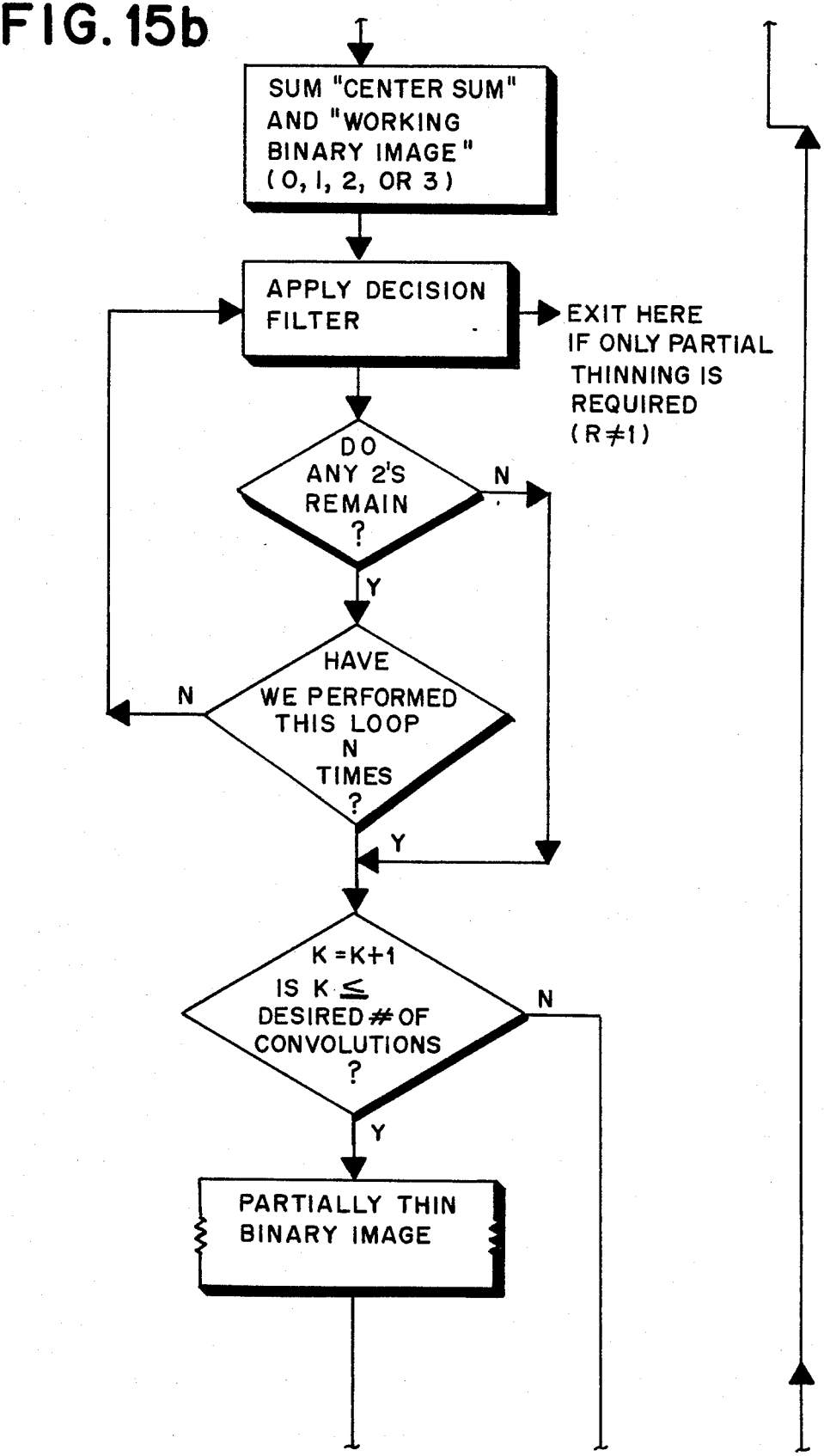
Figure 15C:
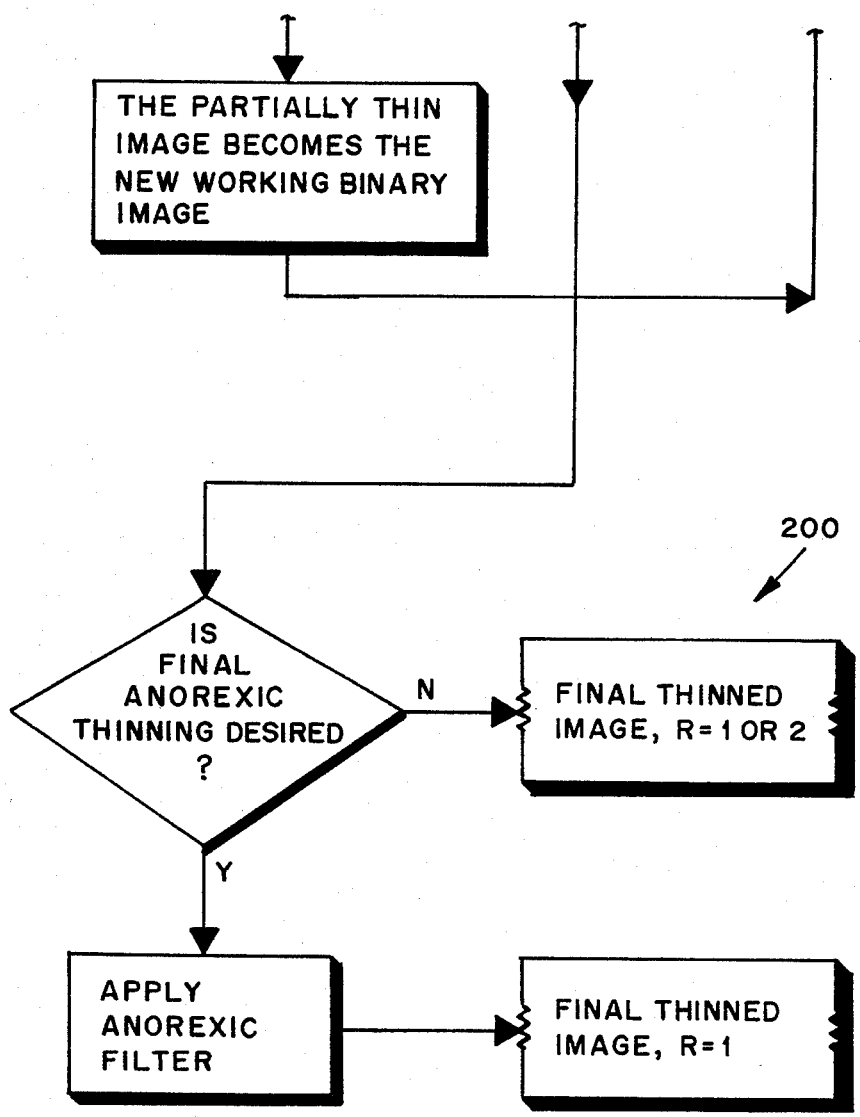

Referring to FIG. 15, a flowchart designated 200 is illustrated for carrying out the process of the present invention with a digital computer. The image is digitized. Thereafter, the desired number of vertical and horizontal convolutions is determined. If the number of convolutions performed is odd, both vertical and horizontal convolutions are applied to the table of right sided center descriptors. If the number of convolutions performed is even, both vertical and horizontal convolutions are applied to the table of left sided center descriptors. That is, in accordance with whether the number of convolutions performed thus far is odd or even, the center descriptors to be applied alternate between left and right sided descriptors. The results of the convolutions are summed with the working binary image and the resulting pixels are assigned the values 0, 1, 2 or 3.

The filter matrix is then applied. If only partial thinning is required, the thinning is terminated after the filter matrix is applied once (EXIT). If the thinning is to proceed, the computer determines if any pixels of value 2 remain. If they do, the decision filter is applied N times. If no pixels of value 2 remain, it is determined whether the desired number of convolutions has been accomplished. When this occurs, it is determined whether anorexic thinning is desired. If not, thinning is complete. If anorexic thinning is desired, the anorexic filter is applied to the thinned image and thinning is complete. If the desired number of convolutions has not been accomplished, the partially thin image becomes the new working image and further convolutions and filtering is applied as desired.

The filter matrix 100 of FIG. 10 is applied sequentially until all or most of the pixels having a value 2 are eliminated. However, with the filter matrix 100 the information provided by the pixels having a value or weight of 3 is used only passively. Advantageously, the pixels having a value 3 may be used actively and a plurality of filter matrices constructed to immediately filter each pixel once in accordance with its value and the values of the pixels in its 3×3 neighborhood, thereby increasing the speed of the thinning process.

Specifically, if the pixel value is 1, the 1s, 2s and 3s present in the 3×3 neighborhood are made 1s and the 0s are made 0, and the filter matrix illustrated in FIG. 16 as 210 is applied in the same manner as the filter matrix 100 of FIG. 10. However, if the pixel value is 2, the values in its 3×3 neighborhood are analyzed and one of three (3) filter matrices is applied as follows: If there are pixels of value 3 present in the 3×3 neighborhood, the 3s are made 1s and the 2s, 1s and 0s are made 0s. The filter matrix illustrated in FIG. 17 as 220 is then applied. If there are no pixels of value 3 present in the 3×3 neighborhood, but pixels of value 2 are present, the 2s and 1s are made 1s and the 0s are made 0. The filter matrix illustrated in FIG. 18 as 230 is then applied. If there are no pixels of value 3 or 2 in the 3×3 neighborhood, but only 1s and 0s, the filter matrix illustrated in FIG. 19 as 240 is applied. It is apparent, that the filter matrix 210 illustrated in FIG. 16 also includes the filter matrix 240 illustrated in FIG. 19.

Figure 20:
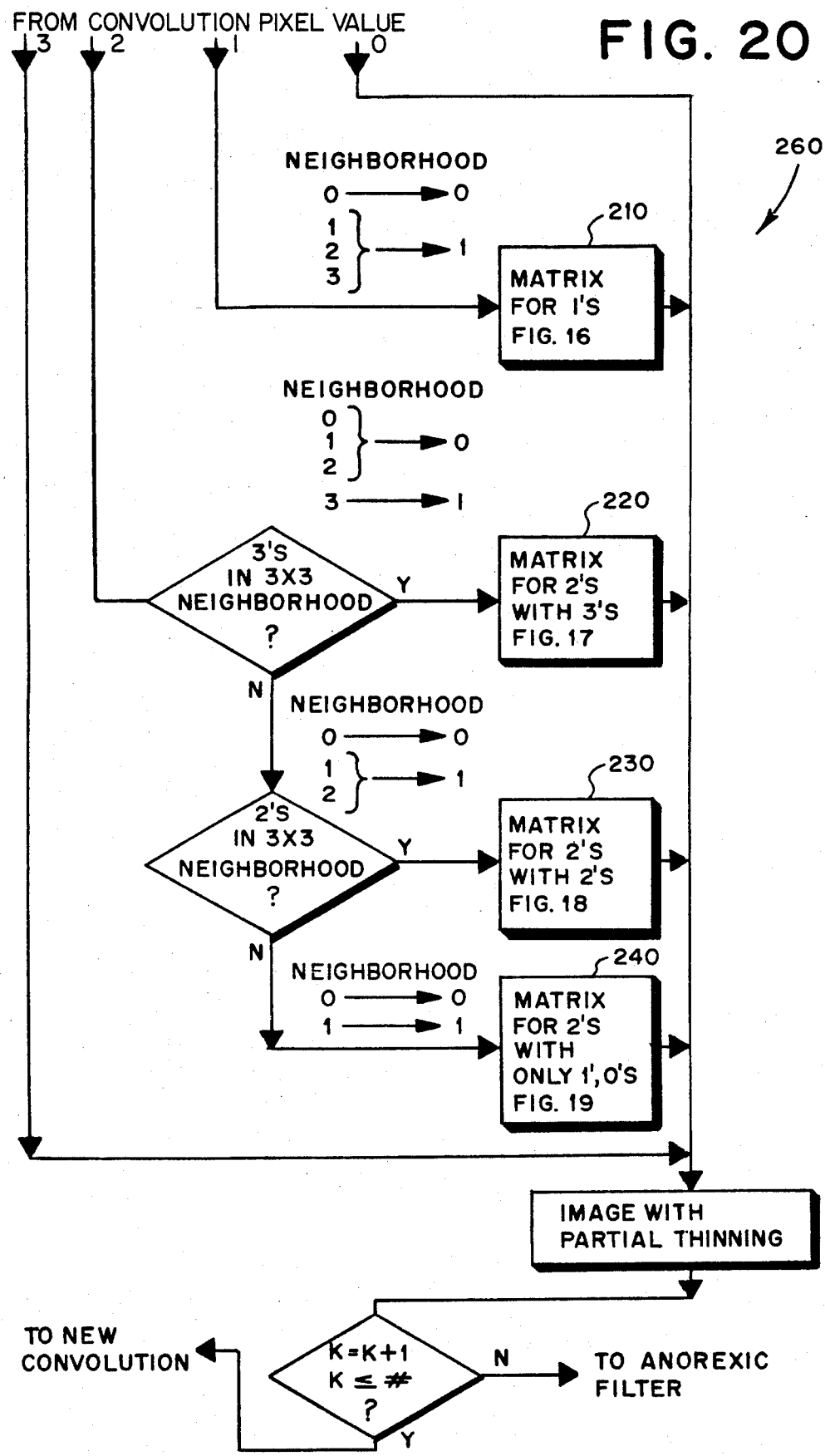
FIG. 20 is a flowchart for implementing the process of the present invention with different matrix filters, where pixels of value 1 and 2 are filtered in one sequence.

Referring to FIG. 20, a flowchart designated 260 is illustrated for using the matrices 210, 220, 230 and 240 of FIGS. 16, 17, 18 and 19 in the process of the present invention. Initially, this process utilizes the same sequence of operations as described with reference to the flowchart 200 of FIG. 15, with the exception of the decision filters to be applied and the two decision blocks thereafter regarding remaining 2s and the number of filters to be applied (the loop). Thereafter, the flowchart illustrated in FIG. 20 as 260 is utilized. If the pixel value is 1 the filter matrix 210 of FIG. 16 is applied. If the pixel value is 2, the 3×3 neighborhood is checked to determine the absence or presence of 3 or 2s therein. If 3s are present, the filter matrix 220 of FIG. 17 is applied. If 2s are present but no 3s, the filter matrix 230 of FIG. 18 is applied. If no 3s or 2s are present in the neighborhood, the filter matrix 240 of FIG. 19 is applied.

Figure 21:
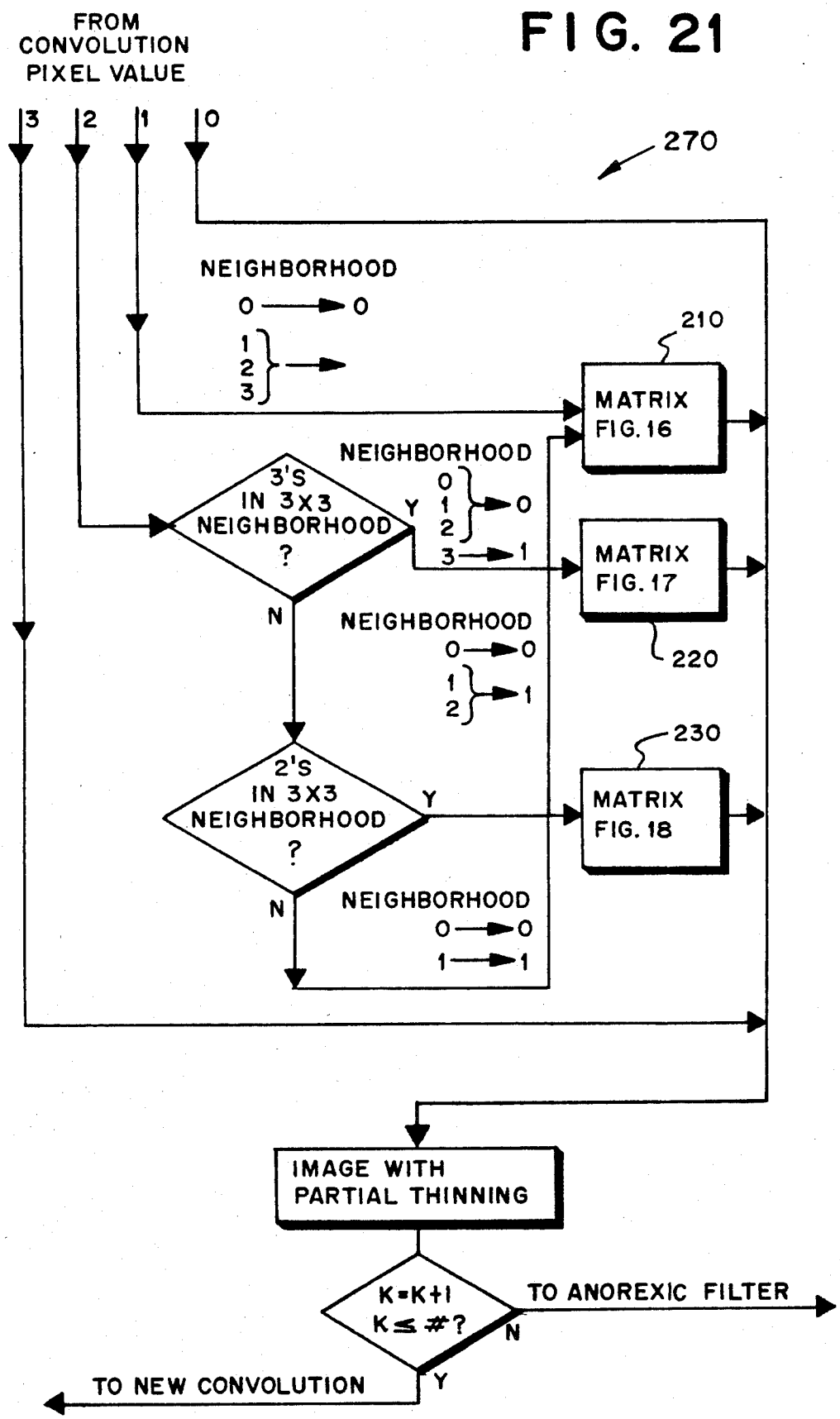
FIG. 21 is a flowchart for implementing the process of the present invention with different filter matrices, where pixels of value 1 and 2 are filtered in one sequence with the filter matrix of FIG. 16 being utilized.

However, if it is desired to utilize the filter matrix 210 of FIG. 16 for both pixels of value 1, and pixels of value 2 without pixels of value 2 or 3 in the 3×3 neighborhood, the flowchart illustrated in FIG. 21 as 270 is utilized in place of the sequence of operations specified in flowchart 260 of FIG. 20.

Specifically, if the pixel has a value of 1 or a value of 2 and no 2s or 3s are present in its 3×3 neighborhood the filter matrix 210 of FIG. 16 is applied. With regard to other pixels of value 2 the filter matrix 220 of FIG. 17 is applied if 3s are present in the 3×3 neighborhood and the filter matrix 230 of FIG. 18 is applied if there are no 3s in the 3×3 neighborhood, but 2s are present in the neighborhood.

Thus, as apparent from the foregoing description, the thinning process of the present invention can employ a weighted convolution, followed by one or more filter matrices, as well as the anorexic filter matrix, as desired. Further, additional weighted convolutions and filtering may be utilized in various combinations as desired. However, if a new convolution is to be applied after filtering, all the non-zero pixels are first made 1 to effectively represent the new working image.

It should be apparent to those skilled in the art that various modifications may be made in the process of the present invention without departing from the spirit and scope thereof, as described in the specification and defined in the appended claims.

PROGRAM APPENDIX

© Pitney Bowes Inc.

```
      INTEGER PARAMS(10)
      INTEGER ITT(256), PRELUT(256), LUT1(256), LUT2(256), GRFLUT(256)
      BYTE LOG(100)
      DATA PRELUT/
   0  0,0,0,0,0,0,0,0,0,3,3,3,0,3,0,3,
   1  0,3,3,3,0,3,3,3,0,3,3,3,0,3,3,3,
   2  0,3,3,3,3,3,3,3,3,3,3,3,3,3,3,3,
   3  0,3,3,3,3,3,3,3,0,3,3,3,3,3,3,3,
   4  0,0,3,3,3,3,3,3,3,3,3,3,3,3,3,3,
   5  0,3,3,3,3,3,3,3,3,3,3,3,3,3,3,3,
   6  0,3,3,3,3,3,3,3,3,3,3,3,3,3,3,3,
   7  0,3,3,3,3,3,3,3,0,3,3,3,3,3,3,3,
   8  0,0,3,0,3,3,3,0,3,3,3,3,3,3,3,3,
   9  3,3,3,3,3,3,3,3,3,3,3,3,3,3,3,3,
   0  3,3,3,3,3,3,3,3,3,3,3,3,3,3,3,3,
   1  3,3,3,3,3,3,3,3,3,3,3,3,3,3,3,3,
   2  0,0,3,3,3,3,3,3,3,3,3,3,3,3,3,3,
   3  3,3,3,3,3,3,3,3,3,3,3,3,3,3,3,3,
   4  0,3,3,3,3,3,3,3,3,3,3,3,3,3,3,3,
   5  3,3,3,3,3,3,3,3,3,3,3,3,3,3,3,3/
      DATA LUT1/
   0  0,3,0,3,3,3,3,0,0,3,3,3,3,3,0,0,
   1  3,3,3,3,3,3,3,3,3,3,3,3,0,3,0,0,
   2  0,3,3,3,3,3,3,3,0,3,0,3,3,3,3,3,
   3  3,3,3,3,3,3,3,3,0,3,3,0,3,0,0,2,
   4  3,3,3,3,3,3,3,3,3,3,3,3,3,3,3,3,
   5  3,3,3,3,3,3,3,3,3,3,3,3,3,3,3,0,
   6  3,3,3,3,3,3,3,3,3,3,3,3,3,3,3,3,
   7  0,3,3,3,3,3,3,3,0,3,3,3,0,0,0,2,
   8  0,3,0,0,3,3,3,0,3,3,3,3,3,3,3,0,
   9  3,3,3,3,3,3,3,3,3,3,3,3,3,3,3,0,
   0  3,3,0,3,3,3,3,3,3,3,0,3,3,3,3,3,
   1  3,3,3,3,3,3,3,3,3,3,3,3,3,3,3,0,
```

```
  2    3,0,3,0,3,3,3,0,3,3,3,3,3,3,3,2,
  3    3,3,3,3,3,3,3,0,3,3,3,3,3,3,3,2,
  4    0,0,3,0,3,3,3,0,3,3,3,3,3,3,3,0,
  5    0,0,3,2,3,0,3,2,0,0,3,0,2,2,0,2/
       DATA LUT2/
  0    0,3,0,3,3,3,3,0,0,3,3,3,3,3,2,0,
  1    3,3,3,3,3,3,3,3,3,3,3,3,0,3,0,2,
  2    0,3,3,3,3,3,3,3,0,3,0,3,3,3,3,3,
  3    3,3,3,3,3,3,3,2,3,3,3,0,3,0,2,
  4    3,3,3,3,3,3,3,3,3,3,3,3,3,3,3,
  5    3,3,3,3,3,3,3,3,3,3,3,3,3,3,0,
  6    3,3,3,3,3,3,3,3,3,3,3,3,3,3,3,
  7    0,3,3,3,3,3,3,3,0,3,3,3,2,2,2,2,
  8    0,3,0,2,3,3,3,0,3,3,3,3,3,3,0,
  9    3,3,3,3,3,3,3,3,3,3,3,3,3,3,2,
  0    3,3,0,3,3,3,3,3,3,0,3,3,3,3,3,
  1    3,3,3,3,3,3,3,3,3,3,3,3,3,3,2,
  2    3,0,3,0,3,3,3,2,3,3,3,3,3,3,3,2,
  3    3,3,3,3,3,3,3,2,3,3,3,3,3,3,2,
  4    2,0,3,0,3,3,3,2,3,3,3,3,3,3,2,
  5    0,2,3,2,3,0,3,2,0,2,3,2,2,2,2,2/
       DATA GRFLUT/
  0    0,3,3,3,3,0,3,3,3,3,3,3,0,0,0,
  1    3,3,3,3,0,3,3,3,3,3,3,3,0,3,0,
  2    3,3,3,3,3,3,3,3,3,3,3,3,3,3,3,
  3    3,3,3,3,3,3,3,0,3,3,3,0,3,3,0,
  4    3,0,3,0,3,3,3,3,3,3,0,3,0,3,3,
  5    0,3,3,3,3,3,3,3,3,3,3,3,3,3,3,
  6    3,0,3,0,3,3,3,3,3,3,3,3,3,3,3,
  7    0,3,3,3,3,3,3,0,3,3,3,0,3,0,0,
  8    3,3,3,0,3,0,3,0,3,3,3,3,0,3,0,
  9    3,3,3,3,3,3,3,3,3,3,3,3,3,3,0,
  0    3,3,3,3,3,3,3,3,3,3,3,3,3,3,3,
  1    3,3,3,3,3,3,3,3,3,3,3,3,3,3,0,
  2    3,3,3,0,3,3,3,3,3,3,3,3,3,3,3,
  3    3,3,3,3,3,3,3,3,3,3,3,3,3,3,0,
  4    0,0,3,0,3,3,3,3,3,3,3,3,3,3,3,
  5    0,3,3,3,3,3,3,0,3,3,0,3,3,0,0/
       CALL IP5INI
       LOGPTR=0
1501   WRITE(5,1500)
1500   FORMAT(' DO YOU WANT THE PRE-THINNING MATRIX?',$)
       READ(5,30) IANS
       IF(IANS .EQ. 'N') GO TO 1
       IF(IANS .NE. 'Y') GO TO 1501
       LOGPTR=LOGPTR+1
       LOG(LOGPTR)='P'
       ITT(1)=255
       ITT(256)=0
       CALL LOADIT(1, ITT)
       CALL CHIPS(PARAMS,'CH2:=0;',IERR)
       IF(IERR .EQ. 1) GO TO 9000
       CALL CHIPS(PARAMS,'CH2 MASK(1) :=CH0 ITTON SCROLL(1,0);',IERR)
       IF(IERR .EQ. 1) GO TO 9000
       CALL CHIPS(PARAMS,'CH2 MASK(10):=CH0 ITTON SCROLL(1,1);',IERR)
       IF(IERR .EQ. 1) GO TO 9000
       CALL CHIPS(PARAMS,'CH2 MASK(100):=CH0 ITTON SCROLL(0,1);',IERR)
       IF(IERR .EQ. 1) GO TO 9000
       CALL CHIPS(PARAMS,'CH2 MASK(1000):=CH0ITTON SCROLL(-1,1);',IERR)
       IF(IERR .EQ. 1) GO TO 9000
       CALL CHIPS(PARAMS,'CH2MASK(10000):=CH0ITTON SCROLL(-1,0);',IERR)
       IF(IERR .EQ. 1) GO TO 9000
       CALL CHIPS(PARAMS,'CH2MASK(100000):=CH0ITTONSCROLL(-1,-1);',IERR)
       IF(IERR .EQ. 1) GO TO 9000
       CALL CHIPS(PARAMS,'CH2MASK(1000000):=CH0ITTONSCROLL(0,-1);',IERR)
       IF(IERR .EQ. 1) GO TO 9000
       CALL CHIPS(PARAMS,'CH2MASK(10000000):=CH0ITTONSCROLL(1,-1);',IERR)
```

```
              IF(IERR .EQ. 1) GO TO 9000
              CALL LOADIT(4, PRELUT)
              CALL CHIPS(PARAMS,
       1      'CH1:=IF(CH2 ITTON=3 THEN BLACK ELSE WHITE);'
       2      , IERR)
              CALL CHIPS(PARAMS, 'CH0:=CH1 OR CH0;', IERR)
              IF(IERR .EQ. 1) GO TO 9000
 1503         WRITE(5,1502)
 1502         FORMAT(' DO YOU WANT TO QUIT NOW?',$)
              READ(5,30)IANS
              IF(IANS .EQ. 'Y') GO TO 8000
              IF(IANS .NE. 'N') GO TO 1503
    1         DO 14 I=1,256
              ITT(I)=0
   14         CONTINUE
              ITT(1)=255
              ITT(256)=0
              CALL LOADIT(1, ITT)
              LOGPTR=LOGPTR+1
              LOG(LOGPTR)='C'
              CALL CHIPS(PARAMS, 'CH1:=0;', IERR)
              IF(IERR .EQ. 1) GO TO 9000
              CALL CHIPS(PARAMS, 'CH2:=0;', IERR)
              IF(IERR .EQ. 1) GO TO 9000
              CALL CHIPS(PARAMS, 'CH1 MASK(1):=CH0 ITTON;', IERR)
              IF(IERR .EQ. 1) GO TO 9000
              CALL CHIPS(PARAMS, 'CH1 MASK(10):=CH0 ITTON SCROLL(-3,0);', IERR)
              IF(IERR .EQ. 1) GO TO 9000
              CALL CHIPS(PARAMS, 'CH1 MASK(100):=CH0 ITTONSCROLL(-2,0);', IERR)
              IF(IERR .EQ. 1) GO TO 9000
              CALL CHIPS(PARAMS, 'CH1 MASK(1000):=CH0ITTONSCROLL(-1,0);', IERR)
              IF(IERR .EQ. 1) GO TO 9000
              CALL CHIPS(PARAMS, 'CH1 MASK(10000):=CH0ITTONSCROLL(1,0);', IERR)
              IF(IERR .EQ. 1) GO TO 9000
              CALL CHIPS(PARAMS, 'CH1 MASK(100000):=CH0ITTONSCROLL(2,0);', IERR)
              IF(IERR .EQ. 1) GO TO 9000
              CALL CHIPS(PARAMS, 'CH1 MASK(1000000):=CH0ITTONSCROLL(3,0);', IERR)
              IF(IERR .EQ. 1) GO TO 9000
              CALL CHIPS(PARAMS, 'CH2 MASK(1):=CH0 ITT ON;', IERR)
              IF(IERR .EQ. 1) GO TO 9000
              CALL CHIPS(PARAMS, 'CH2 MASK(10):=CH0ITTONSCROLL(0,-3);', IERR)
              IF(IERR .EQ. 1) GO TO 9000
              CALL CHIPS(PARAMS, 'CH2 MASK(100):=CH0ITTONSCROLL(0,-2);', IERR)
              IF(IERR .EQ. 1) GO TO 9000
              CALL CHIPS(PARAMS, 'CH2 MASK(1000):=CH0ITTONSCROLL(0,-1);', IERR)
              IF(IERR .EQ. 1) GO TO 9000
              CALL CHIPS(PARAMS, 'CH2 MASK(10000):=CH0ITTONSCROLL(0,1);', IERR)
              IF(IERR .EQ. 1) GO TO 9000
              CALL CHIPS(PARAMS, 'CH2 MASK(100000):=CH0ITTONSCROLL(0,2);', IERR)
              IF(IERR .EQ. 1) GO TO 9000
              CALL CHIPS(PARAMS, 'CH2 MASK(1000000):=CH0ITTONSCROLL(0,3);', IERR)
              IF(IERR .EQ. 1) GO TO 9000
              DO 10 I=1,256
              ITT(I)=0
   10         CONTINUE
              ITT(2)=1
              ITT(4)=1
              ITT(6)=1
              ITT(8)=1
              ITT(10)=1
              ITT(12)=1
              ITT(18)=1
              ITT(20)=1
              ITT(22)=1
              ITT(24)=1
              ITT(26)=1
              ITT(28)=1
```

```
        ITT(30)=1
        ITT(34)=1
        ITT(36)=1
        ITT(38)=1
        ITT(40)=1
        ITT(42)=1
        ITT(44)=1
        ITT(62)=1
        ITT(64)=1
        ITT(66)=1
        ITT(68)=1
        ITT(70)=1
        ITT(72)=1
        ITT(74)=1
        ITT(76)=1
        ITT(90)=1
        ITT(92)=1
        ITT(94)=1
        ITT(98)=1
        ITT(100)=1
        ITT(102)=1
        ITT(104)=1
        ITT(106)=1
        ITT(108)=1
        ITT(128)=1
        CALL LOADIT(6, ITT)
        ITT(1)=1
        ITT(256)=0
        CALL LOADIT(1, ITT)
        CALL CHIPS(PARAMS, 'CH1:=CH1 ITTON + CH2 ITTON;', IERR)
        IF(IERR .EQ. 1) GO TO 9000
        CALL CHIPS(PARAMS, 'CH1:=CH1 + CH0 ITTON;',IERR)
        IF(IERR .EQ. 1) GO TO 9000
5       CALL LOADIT(4, LUT1)
        LOGPTR=LOGPTR+1
        LOG(LOGPTR)='M'
        ITT(1)=0
        ITT(2)=255
        ITT(3)=255
        ITT(4)=255
        CALL LOADIT(2, ITT)
        CALL CHIPS(PARAMS, 'CH2:=0;',IERR)
        IF(IERR .EQ. 1) GO TO 9000
        CALL CHIPS(PARAMS, 'CH2 MASK(1) :=CH1 ITTON SCROLL(1,0);',IERR)
        IF(IERR .EQ. 1) GO TO 9000
        CALL CHIPS(PARAMS, 'CH2 MASK(10):=CH1 ITTON SCROLL(1,1);',IERR)
        IF(IERR .EQ. 1) GO TO 9000
        CALL CHIPS(PARAMS, 'CH2 MASK(100):=CH1 ITTON SCROLL(0,1);',IERR)
        IF(IERR .EQ. 1) GO TO 9000
        CALL CHIPS(PARAMS, 'CH2 MASK(1000):=CH1ITTON SCROLL(-1,1);',IERR)
        IF(IERR .EQ. 1) GO TO 9000
        CALL CHIPS(PARAMS, 'CH2MASK(10000):=CH1ITTON SCROLL(-1,0);',IERR)
        IF(IERR .EQ. 1) GO TO 9000
        CALL CHIPS(PARAMS, 'CH2MASK(100000):=CH1ITTONSCROLL(-1,-1);',IERR)
        IF(IERR .EQ. 1) GO TO 9000
        CALL CHIPS(PARAMS, 'CH2MASK(1000000):=CH1ITTONSCROLL(0,-1);',IERR)
        IF(IERR .EQ. 1) GO TO 9000
        CALL CHIPS(PARAMS, 'CH2MASK(10000000):=CH1ITTONSCROLL(1,-1);',IERR)
        IF(IERR .EQ. 1) GO TO 9000
        CALL CHIPS(PARAMS,
1       'CH3:=CH1 IF(CH1 <> 1 THEN FIRST ELSE SECOND)CH2 ITTON;'
2       ,IERR)
        IF(IERR .EQ. 1) GO TO 9000
        CALL LOADIT(4, LUT2)
        CALL CHIPS(PARAMS,
1       'CH3:=IF(CH1 <> 2 THEN NOP ELSE SECOND)CH2 ITTON;'
2       ,IERR)
```

```
       IF(IERR .EQ. 1) GO TO 9000
       CALL CHIPS(PARAMS, 'CH1:=CH3;', IERR)
       IF(IERR .EQ. 1) GO TO 9000
       ITT(4)=0
       ITT(3)=83
       ITT(2)=166
       ITT(1)=255
       CALL CHIPS(PARAMS, 'P1,P2:=COUNT(CH1=2);', IERR)
       PIXELS=FLOAT(PARAMS(2))+FLOAT(PARAMS(1))*32768.0
       WRITE(5,132) PIXELS
132    FORMAT(' THERE REMAIN ',F10.0,' PIXELS OF VALUE TWO.')
       CALL LOADIT(2,ITT)
       CALL NBLITT(2,  3)
       IF(PIXELS .EQ. 0.0) GO TO 179
178    WRITE(5,20)
20     FORMAT(' DO YOU WANT ANOTHER MATRIX APPLICATION? (Y/N)',$)
       READ(5,30) IANS
30     FORMAT(A1)
       IF(IANS .EQ. 'Y') GO TO 5
       IF(IANS .NE. 'N') GO TO 178
179    WRITE(5,1492)
1492   FORMAT(' DO YOU WANT ANOTHER CONVOLUTION? (Y/N)',$)
       READ(5,30) IANS
       IF(IANS .EQ. 'N') GO TO 1493
       IF(IANS .NE. 'Y') GO TO 178
       CALL CHIPS(PARAMS,'CH0:=IF(CH1=0 THEN WHITE ELSE BLACK);', IERR)
       GO TO 1
1493   WRITE(5,7490)
7490   FORMAT(' DO YOU WANT THE GRAND FINALLY MATRIX?',$)
       READ(5,30) IANS
       IF(IANS .EQ. 'N') GO TO 8000
       IF(IANS .NE. 'Y') GO TO 1493
       CALL LOADIT(4, GRFLUT)
       LOGPTR=LOGPTR+1
       LOG(LOGPTR)='G'
       ITT(1)=0
       ITT(2)=255
       ITT(3)=255
       ITT(4)=255
       CALL LOADIT(2, ITT)
       CALL CHIPS(PARAMS, 'CH2:=0;',IERR)
       IF(IERR .EQ. 1) GO TO 9000
       CALL CHIPS(PARAMS, 'CH2 MASK(1)  :=CH1 ITTON SCROLL(1,0);',IERR)
       IF(IERR .EQ. 1) GO TO 9000
       CALL CHIPS(PARAMS, 'CH2 MASK(10):=CH1 ITTON SCROLL(1,1);',IERR)
       IF(IERR .EQ. 1) GO TO 9000
       CALL CHIPS(PARAMS, 'CH2 MASK(100):=CH1 ITTON SCROLL(0,1);',IERR)
       IF(IERR .EQ. 1) GO TO 9000
       CALL CHIPS(PARAMS, 'CH2 MASK(1000):=CH1ITTON SCROLL(-1,1);',IERR)
       IF(IERR .EQ. 1) GO TO 9000
       CALL CHIPS(PARAMS, 'CH2MASK(10000):=CH1 ITTON SCROLL(-1,0);',IERR)
       IF(IERR .EQ. 1) GO TO 9000
       CALL CHIPS(PARAMS, 'CH2MASK(100000):=CH1ITTONSCROLL(-1,-1);',IERR)
       IF(IERR .EQ. 1) GO TO 9000
       CALL CHIPS(PARAMS, 'CH2MASK(1000000):=CH1ITTONSCROLL(0,-1);',IERR)
       IF(IERR .EQ. 1) GO TO 9000
       CALL CHIPS(PARAMS, 'CH2MASK(10000000):=CH1ITTONSCROLL(1,-1);',IERR)
       IF(IERR .EQ. 1) GO TO 9000
       ITT(1)=255
       ITT(2)=0
       ITT(3)=0
       ITT(4)=0
       CALL LOADIT(2,ITT)
       CALL CHIPS(PARAMS,
     1 'CH1:=IF(CH1 ITTON = 255 THEN NOP ELSE SECOND)CH2 ITTON;'
     2 ,IERR)
       IF(IERR .EQ. 1) GO TO 9000
```

```
            ITT(4)=0
            ITT(3)=83
            ITT(2)=166
            ITT(1)=255
            CALL LOADIT(2,ITT)
            CALL NBLITT(2, 3)
            CALL CHIPS(PARAMS,'CH0:=IF(CH1=0 THEN WHITE ELSE BLACK);', IERR)
8000        WRITE(5,8001) (LOG(I), I=1, LOGPTR)
8001        FORMAT(' PROCESSING LOG: ',64A1)
            STOP
9000        WRITE(5,50)
50          FORMAT(' CRASH!!!!!!!!!!')
            STOP
            END

INTEGER PARAMS(10)
            INTEGER ITT(256), PRELUT(256), LUT1S(256), LUT23S(256),
     1      LUT22S(256), LUT21S(256), GRFLUT(256)
            BYTE LOG(100)

DATA PRELUT/
     0      0,0,0,0,0,0,0,0,0,3,3,3,0,3,0,3,
     1      0,3,3,3,0,3,3,3,0,3,3,3,0,3,3,3,
     2      0,3,3,3,3,3,3,3,0,3,3,3,3,3,3,3,
     3      0,3,3,3,3,3,3,0,0,3,3,3,3,3,3,3,
     4      0,0,3,3,3,3,3,3,3,3,3,3,3,3,3,3,
     5      0,3,3,3,3,3,3,3,3,3,3,3,3,3,3,3,
     6      0,3,3,3,3,3,3,3,3,3,3,3,3,3,3,3,
     7      0,3,3,3,3,3,3,0,3,3,3,3,3,3,3,3,
     8      0,0,3,0,3,3,3,0,3,3,3,3,3,3,3,3,
     9      3,3,3,3,3,3,3,3,3,3,3,3,3,3,3,3,
     0      3,3,3,3,3,3,3,3,3,3,3,3,3,3,3,3,
     1      3,3,3,3,3,3,3,3,3,3,3,3,3,3,3,3,
     2      0,0,3,3,3,3,3,3,3,3,3,3,3,3,3,3,
     3      3,3,3,3,3,3,3,3,3,3,3,3,3,3,3,3,
     4      0,3,3,3,3,3,3,3,3,3,3,3,3,3,3,3,
     5      3,3,3,3,3,3,3,3,3,3,3,3,3,3,3,3/

DATA LUT1S/
     0      0,0,0,0,0,3,0,0,0,0,0,0,0,0,0,0,
     1      0,0,0,0,3,3,0,3,0,0,0,0,0,3,0,0,
     2      0,0,0,0,0,0,0,3,0,0,0,0,0,0,0,3,
     3      0,0,0,0,0,3,0,3,0,0,0,0,0,0,0,0,
     4      0,3,0,0,0,3,0,3,0,0,0,0,3,0,0,0,
     5      3,3,0,3,3,3,3,3,0,3,0,0,3,3,0,0,
     6      0,0,0,0,0,3,0,3,0,0,0,3,0,0,0,3,
     7      0,3,3,3,3,3,3,3,0,0,3,3,0,0,0,0,
     8      0,0,0,0,0,0,0,0,0,0,0,0,0,0,0,0,
     9      0,0,0,0,0,3,0,0,0,0,0,0,3,3,3,0,
     0      0,0,0,0,0,0,0,3,0,0,0,0,0,3,0,0,
     1      0,0,0,0,0,0,3,3,0,0,0,0,0,3,0,0,
     2      0,0,0,0,0,3,0,0,0,3,0,0,0,3,0,0,
     3      0,3,0,0,3,3,0,0,0,3,3,3,3,3,3,0,
     4      0,0,0,0,0,0,0,0,0,3,0,0,0,3,0,0,
     5      0,0,3,0,0,0,3,0,0,0,0,0,0,0,0,0/
            DATA LUT23S/
     0      0,0,0,0,0,0,0,0,0,3,3,3,0,3,0,0,
     1      0,3,3,3,0,0,0,0,0,3,3,3,0,0,0,0,
     2      0,3,3,3,3,3,3,3,3,3,3,3,3,3,3,3,
     3      0,3,3,3,0,0,0,0,3,3,3,3,0,0,0,0,
     4      0,0,3,0,3,0,3,0,3,3,3,3,3,3,3,0,
     5      0,0,3,0,0,0,0,0,0,0,3,0,0,0,3,0,
     6      0,0,3,0,3,0,3,0,3,3,3,3,3,3,0,0,
     7      0,0,3,0,0,0,0,0,0,0,0,0,0,0,0,0,
     8      0,0,3,0,3,0,3,0,3,3,3,3,3,0,3,0,
```

```
     9  3,3,3,3,3,0,3,0,3,3,3,3,3,0,3,0,
     0  3,3,3,3,3,3,3,0,3,3,3,3,3,3,3,3,
     1  3,3,3,3,3,0,3,0,3,3,3,3,3,0,0,0,
     2  0,0,3,0,3,0,3,0,3,3,3,3,3,0,3,0,
     3  3,0,3,0,0,0,0,0,0,0,3,0,0,0,0,0,
     4  0,0,3,0,3,3,3,0,3,3,3,0,3,0,3,0,
     5  0,0,3,0,0,0,0,0,0,0,3,0,0,0,0,0/
        DATA LUT22S/
     0  0,0,0,0,0,3,0,0,0,3,0,3,0,3,0,0,
     1  0,0,3,3,3,3,3,3,0,3,3,0,0,3,3,0,
     2  0,3,0,3,3,3,3,3,0,3,0,3,3,3,3,3,
     3  0,3,3,3,3,3,3,0,3,3,3,0,3,3,3,
     4  0,3,3,3,0,3,3,3,3,3,3,3,3,3,3,3,
     5  3,3,3,3,3,0,3,0,3,3,3,3,3,0,3,0,
     6  0,3,3,3,3,3,3,3,3,3,3,0,3,3,3,
     7  0,3,3,3,3,0,3,3,3,3,3,3,0,0,3,0,
     8  0,0,0,3,3,3,3,0,3,0,3,0,3,3,3,3,
     9  3,3,3,3,3,3,3,3,3,3,3,3,3,3,3,3,
     0  0,3,0,3,3,3,3,3,0,3,0,3,3,3,3,3,
     1  3,0,3,3,3,3,3,3,3,3,3,3,3,3,3,3,
     2  0,0,3,0,3,3,0,0,3,3,3,3,3,3,3,3,
     3  3,3,3,3,3,0,3,0,3,3,3,3,3,3,3,0,
     4  0,3,3,3,3,3,3,3,3,3,3,3,3,3,3,3,
     5  0,0,3,3,3,0,3,0,3,3,3,3,3,0,3,0/
        DATA LUT21S/
     0  0,0,0,0,0,3,0,0,0,0,0,0,0,0,0,0,
     1  0,0,0,0,3,3,0,3,0,0,0,0,0,3,0,0,
     2  0,0,0,0,0,0,0,3,0,0,0,0,0,0,0,3,
     3  0,0,0,0,0,3,0,3,0,0,0,0,0,0,0,0,
     4  0,3,0,0,0,3,0,3,0,0,0,0,0,3,0,0,
     5  3,3,0,3,3,3,3,3,0,3,0,0,3,3,0,0,
     6  0,0,0,0,0,3,0,3,0,0,0,3,0,0,0,3,
     7  0,3,3,3,3,3,3,0,0,3,3,0,0,0,0,0,
     8  0,0,0,0,0,0,0,0,0,0,0,0,0,0,0,0,
     9  0,0,0,0,0,3,0,0,0,0,0,0,3,3,3,0,
     0  0,0,0,0,0,0,3,0,0,0,0,0,3,0,0,0,
     1  0,0,0,0,0,3,3,0,0,0,0,0,3,0,0,0,
     2  0,0,0,0,0,3,0,0,0,3,0,0,0,3,0,0,
     3  0,3,0,0,3,3,0,0,0,3,3,3,3,3,3,0,
     4  0,0,0,0,0,0,0,0,0,3,0,0,0,3,0,0,
     5  0,0,3,0,0,0,3,0,0,0,0,0,0,0,0,0/
        DATA GRFLUT/
     0  0,3,3,3,3,0,3,3,3,3,3,3,3,3,0,3,
     1  3,3,3,3,0,3,3,3,3,3,3,3,0,3,3,3,
     2  3,3,3,3,3,3,3,3,3,3,3,3,3,3,3,3,
     3  3,3,3,3,3,3,3,3,0,3,3,3,0,3,3,3,
     4  3,0,3,0,3,3,3,0,3,3,3,3,3,3,3,3,
     5  0,3,3,3,3,3,3,0,3,3,3,0,3,3,3,
     6  3,0,3,0,3,3,3,3,3,3,3,3,3,3,3,
     7  0,0,3,3,3,3,3,0,3,3,3,0,3,3,3,
     8  3,3,3,0,3,3,3,3,3,3,3,3,3,3,3,
     9  3,3,3,3,3,3,3,3,3,3,3,3,3,3,3,
     0  3,3,3,3,3,3,3,3,3,3,3,3,3,3,3,
     1  3,3,3,3,3,3,3,3,3,3,3,3,3,3,3,
     2  3,3,3,3,3,3,3,3,3,3,3,3,3,3,3,
     3  0,0,3,3,3,3,3,0,3,3,3,3,3,3,3,
     4  0,0,3,0,3,3,3,0,3,3,3,3,3,3,3,
     5  0,0,3,0,3,3,3,3,0,0,3,3,3,3,3,3/

CALL IP5INI

LOGPTR=0
        ITT0=1
        ITT1=2
        ITT2=4
        ITT3=8
1501    WRITE(5,1500)
```

```
1500      FORMAT(' DO YOU WANT THE PRE-THINNING MATRIX?',$)
          READ(5,30) IANS
          IF(IANS .EQ. 'N') GO TO 1
          IF(IANS .NE. 'Y') GO TO 1501
          LOGPTR=LOGPTR+1
          LOG(LOGPTR)='P'

ITT(1)=255
          ITT(256)=0

CALL LOADIT(ITT0, ITT)
          CALL CONVLV(0, 2, IERR)
          IF(IERR .EQ. 1) GO TO 9000
          CALL LOADIT(ITT2, PRELUT)

CALL CHIPS(PARAMS,
     1    'CH1:=IF(CH2 ITTON=3 THEN BLACK ELSE WHITE);'
     2    , IERR)

CALL CHIPS(PARAMS, 'CH0:=CH1 OR CH0;', IERR)
          IF(IERR .EQ. 1) GO TO 9000
1503      WRITE(5,1502)
1502      FORMAT(' DO YOU WANT TO QUIT NOW?',$)
          READ(5,30)IANS
          IF(IANS .EQ. 'Y') GO TO 8000
          IF(IANS .NE. 'N') GO TO 1503
1         DO 14 I=1,256
          ITT(I)=0
14        CONTINUE
          ITT(1)=255
          ITT(256)=0
          CALL LOADIT(ITT0, ITT)
          LOGPTR=LOGPTR+1
          LOG(LOGPTR)='C'
          CALL CHIPS(PARAMS, 'CH1:=0;', IERR)
          IF(IERR .EQ. 1) GO TO 9000
          CALL CHIPS(PARAMS, 'CH2:=0;', IERR)
          IF(IERR .EQ. 1) GO TO 9000
          CALL CHIPS(PARAMS, 'CH1 MASK(1):=CH0 ITTON;', IERR)
          IF(IERR .EQ. 1) GO TO 9000
          CALL CHIPS(PARAMS,'CH1 MASK(10):=CH0 ITTON SCROLL(-3,0);',IERR)
          IF(IERR .EQ. 1) GO TO 9000
          CALL CHIPS(PARAMS,'CH1 MASK(100):=CH0 ITTONSCROLL(-2,0);',IERR)
          IF(IERR .EQ. 1) GO TO 9000
          CALL CHIPS(PARAMS,'CH1 MASK(1000):=CH0ITTONSCROLL(-1,0);',IERR)
          IF(IERR .EQ. 1) GO TO 9000
          CALL CHIPS(PARAMS,'CH1 MASK(10000):=CH0ITTONSCROLL(1,0);',IERR)
          IF(IERR .EQ. 1) GO TO 9000
          CALL CHIPS(PARAMS,'CH1 MASK(100000):=CH0ITTONSCROLL(2,0);',IERR)
          IF(IERR .EQ. 1) GO TO 9000
          CALL CHIPS(PARAMS,'CH1 MASK(1000000):=CH0ITTONSCROLL(3,0);',IERR)
          IF(IERR .EQ. 1) GO TO 9000
          CALL CHIPS(PARAMS,'CH2 MASK(1):=CH0 ITT ON;',IERR)
          IF(IERR .EQ. 1) GO TO 9000
          CALL CHIPS(PARAMS,'CH2 MASK(10):=CH0ITTONSCROLL(0,-3);',IERR)
          IF(IERR .EQ. 1) GO TO 9000
          CALL CHIPS(PARAMS,'CH2 MASK(100):=CH0ITTONSCROLL(0,-2);',IERR)
          IF(IERR .EQ. 1) GO TO 9000
          CALL CHIPS(PARAMS,'CH2 MASK(1000):=CH0ITTONSCROLL(0,-1);',IERR)
          IF(IERR .EQ. 1) GO TO 9000
          CALL CHIPS(PARAMS,'CH2 MASK(10000):=CH0ITTONSCROLL(0,1);',IERR)
          IF(IERR .EQ. 1) GO TO 9000
          CALL CHIPS(PARAMS,'CH2 MASK(100000):=CH0ITTONSCROLL(0,2);',IERR)
          IF(IERR .EQ. 1) GO TO 9000
          CALL CHIPS(PARAMS,'CH2 MASK(1000000):=CH0ITTONSCROLL(0,3);',IERR)
          IF(IERR .EQ. 1) GO TO 9000
          DO 10 I=1,256
```

```
            ITT(I)=0
10       CONTINUE
         ITT(2)=1
         ITT(4)=1
         ITT(6)=1
         ITT(8)=1
         ITT(10)=1
         ITT(12)=1
         ITT(26)=1
         ITT(28)=1
         ITT(30)=1
         ITT(34)=1
         ITT(36)=1
         ITT(38)=1
         ITT(40)=1
         ITT(42)=1
         ITT(44)=1
         ITT(62)=1
         ITT(64)=1
         ITT(66)=1
         ITT(68)=1
         ITT(70)=1
         ITT(72)=1
         ITT(74)=1
         ITT(76)=1
         ITT(90)=1
         ITT(92)=1
         ITT(94)=1
         ITT(98)=1
         ITT(100)=1
         ITT(102)=1
         ITT(104)=1
         ITT(106)=1
         ITT(108)=1
         ITT(128)=1
         CALL LOADIT(ITT1+ITT2, ITT)
         ITT(1)=1
         ITT(256)=0
         CALL LOADIT(ITT0, ITT)
D        PAUSE 'CHECK THE CONVOLUTIONS...'
         CALL CHIPS(PARAMS, 'CH1:=CH1 ITTON + CH2 ITTON;', IERR)
         IF(IERR .EQ. 1) GO TO 9000
         CALL CHIPS(PARAMS, 'CH1:=CH1 + CH0 ITTON;', IERR)
         IF(IERR .EQ. 1) GO TO 9000
D        PAUSE 'CHECK THE SUM'

5        LOGPTR=LOGPTR+1
         LOG(LOGPTR)='M'
         CALL CHIPS(PARAMS, 'CH3:=0;', IERR)
         CALL CHIPS(PARAMS, 'CH3:=IF(CH1=3 THEN SECOND ELSE NOP) 3;'
     1   , IERR)
         ITT(1)=0
         ITT(2)=255
         ITT(3)=255
         ITT(4)=255
         CALL LOADIT(ITT1, ITT)
         CALL CONVLV(1, 2, IERR)
         IF(IERR .EQ. 1) GO TO 9000

CALL LOADIT(ITT2, LUT1S)
         CALL CHIPS(PARAMS,
     1   'CH3:=IF(CH1 = 1 THEN SECOND ELSE NOP)CH2 ITTON;'
     2   , IERR)
         IF(IERR .EQ. 1) GO TO 9000
         ITT(1)=0
         ITT(2)=0
         ITT(3)=0
```

```
        ITT(4)=255
        CALL LOADIT(ITT1, ITT)
        CALL CONVLV(1, 2, IERR)
        IF(IERR .EQ. 1) GO TO 9000
        CALL LOADIT(ITT2, LUT23S)
        CALL CHIPS(PARAMS,
    1    'CH2:=IF(CH1 <> 2 THEN BLACK ELSE NOP);'
    2    ,IERR)
        IF(IERR .EQ. 1) GO TO 9000
        CALL CHIPS(PARAMS, 'CH0:=CH2 ITTON;', IERR)
        CALL CHIPS(PARAMS,
    1    'CH3:=IF(CH2 = 0 THEN NOP ELSE SECOND) CH 0;', IERR)
        IF(IERR .EQ. 1) GO TO 9000
        ITT(1)=0
        ITT(2)=0
        ITT(3)=255
        ITT(4)=255
        CALL LOADIT(ITT1, ITT)
        CALL CONVLV(1, 0, IERR)
        IF(IERR .EQ. 1) GO TO 9000
        CALL CHIPS(PARAMS, 'CH0:=IF(CH2<>0 THEN BLACK ELSE NOP);',IERR)
        CALL CHIPS(PARAMS, 'CH0:=IF(CH1<>2 THEN BLACK ELSE NOP);',IERR)
        ITT(1)=0
        ITT(2)=255
        ITT(3)=255
        ITT(4)=255
        CALL LOADIT(ITT1, ITT)
        CALL CONVLV(1, 2, IERR)
        IF(IERR .EQ. 1) GO TO 9000
        CALL LOADIT(ITT2, LUT22S)
        CALL CHIPS(PARAMS,
    1    'CH3:= IF(CH0<>0 THEN SECOND ELSE NOP)CH2 ITTON;', IERR)
        CALL CHIPS(PARAMS,
    1    'CH2:=IF(CH0<>0 THEN BLACK ELSE NOP);', IERR)
        CALL LOADIT(ITT2, LUT21S)
        CALL CHIPS(PARAMS,
    1    'CH2:= IF(CH1<>2 THEN BLACK ELSE NOP);', IERR)
        CALL CHIPS(PARAMS, 'CH0:=CH2 ITTON;', IERR)
        CALL CHIPS(PARAMS,
    1    'CH3:= IF(CH2<>0 THEN SECOND ELSE NOP) CH0;', IERR)
        CALL CHIPS(PARAMS, 'CH1:=CH3;', IERR)
        CALL CHIPS(PARAMS,'CH0:=IF(CH1=0 THEN WHITE ELSE BLACK);', IERR)
        ITT(4)=0
        ITT(3)=83
        ITT(2)=166
        ITT(1)=255
        CALL CHIPS(PARAMS, 'P1,P2:=COUNT(CH1=2);', IERR)
        PIXELS=FLOAT(PARAMS(2))+FLOAT(PARAMS(1))*32768.0
        WRITE(5,132) PIXELS
 132    FORMAT(' THERE REMAIN ',F10.0,' PIXELS OF VALUE TWO.')
        CALL LOADIT(ITT1,ITT)
        CALL NBLITT(ITT1, 3)
        IF(PIXELS .EQ. 0.0) GO TO 179
 178    WRITE(5,20)
 20     FORMAT(' DO YOU WANT ANOTHER MATRIX APPLICATION? (Y/N)',$)
        READ(5,30) IANS
 30     FORMAT(A1)
        IF(IANS .EQ. 'Y') GO TO 5
        IF(IANS .NE. 'N') GO TO 178
 179    WRITE(5,1492)
 1492   FORMAT(' DO YOU WANT ANOTHER CONVOLUTION? (Y/N)',$)
        READ(5,30) IANS
        IF(IANS .EQ. 'N') GO TO 1493
        IF(IANS .NE. 'Y') GO TO 178
        GO TO 1
 1493   WRITE(5,7490)
 7490   FORMAT(' DO YOU WANT THE GRAND FINALLY MATRIX?',$)
```

```
      READ(5,30) IANS
      IF(IANS .EQ. 'N') GO TO 8000
      IF(IANS .NE. 'Y') GO TO 1493
      CALL LOADIT(ITT2, GRFLUT)

LOGPTR=LOGPTR+1
      LOG(LOGPTR)='G'

ITT(1)=0
      ITT(2)=255
      ITT(3)=255
      ITT(4)=255
      CALL LOADIT(ITT1, ITT)
      CALL CONVLV(1, 2, IERR)
      IF(IERR .NE. 0) GO TO 9000
      ITT(1)=255
      ITT(2)=0
      ITT(3)=0
      ITT(4)=0
      CALL LOADIT(ITT1 , ITT)
      CALL CHIPS(PARAMS,
    1 'CH1:=IF(CH1 ITTON = 255 THEN NOP ELSE SECOND)CH2 ITTON;'
    2 ,IERR)
      IF(IERR .EQ. 1) GO TO 9000
      ITT(4)=0
      ITT(3)=83
      ITT(2)=166
      ITT(1)=255
      CALL LOADIT(ITT1, ITT)
      CALL NBLITT(ITT1,   3)
      CALL CHIPS(PARAMS, 'CH0:=IF(CH1=0 THEN WHITE ELSE BLACK);', IERR)

8000  WRITE(5,8001) (LOG(I), I=1, LOGPTR)
8001  FORMAT(' PROCESSING LOG: ',64A1)
      STOP
9000  WRITE(5,50)
50    FORMAT(' CRA'       !!!!!!!')
      STOP
      END

SUBROUTINE CONVLV(IN, OUT, ERROR)

INTEGER IN, OUT, PARAMS(10), ERROR

ERROR=0
      PARAMS(1)=IN
      PARAMS(2)=OUT

CALL CHIPS(PARAMS, 'CHP2:=0;', IERR)
      IF(IERR .EQ. 1) GO TO 9000

CALL CHIPS(PARAMS,
    1 'CHP2 MASK(00000001) := CHP1 ITTON SCROLL( 1,  0);',IERR)
      IF(IERR .EQ. 1) GO TO 9000

CALL CHIPS(PARAMS,
    1 'CHP2 MASK(00000010) := CHP1 ITTON SCROLL( 1,  1);',IERR)
      IF(IERR .EQ. 1) GO TO 9000

CALL CHIPS(PARAMS,
    1 'CHP2 MASK(00000100) := CHP1 ITTON SCROLL( 0,  1);',IERR)
      IF(IERR .EQ. 1) GO TO 9000

CALL CHIPS(PARAMS,
    1 'CHP2 MASK(00001000) := CHP1 ITTON SCROLL(-1,  1);',IERR)
      IF(IERR .EQ. 1) GO TO 9000
```

```
        CALL CHIPS(PARAMS,
    1    'CHP2 MASK(00010000) := CHP1 ITTON SCROLL(-1,  0);',IERR)
        IF(IERR .EQ. 1) GO TO 9000

CALL CHIPS(PARAMS,
    1    'CHP2 MASK(00100000) := CHP1 ITTON SCROLL(-1, -1);',IERR)
        IF(IERR .EQ. 1) GO TO 9000

CALL CHIPS(PARAMS,
    1    'CHP2 MASK(01000000) := CHP1 ITTON SCROLL( 0, -1);',IERR)
        IF(IERR .EQ. 1) GO TO 9000

CALL CHIPS(PARAMS,
    1    'CHP2 MASK(10000000) := CHP1 ITTON SCROLL( 1, -1);',IERR)
        IF(IERR .EQ. 1) GO TO 9000
        RETURN

9000    ERROR=1

RETURN
        END
```

What is claimed is:

1. A machine process for thinning an image, comprising the steps of:

defining an image in terms of a plurality of discrete picture elements (pixels);

convolving each horizontal string of pixels of the image with itself shifted a predetermined number of pixels;

weighting each shifted position of each horizontal string;

selecting certain of the pixels of the weighted horizontally convolved pixel strings which correspond to predetermined descriptors;

convolving each vertical string of pixels of the image with itself shifted a predetermined number of pixels;

weighting each shifted position of each vertical string;

selecting certain of the pixels of the weighted vertically convolved pixel strings which correspond to predetermined descriptors;

adding the selected pixels from the horizontal and vertical weighted convolutions and the pixels of the original image;

retaining those pixels which are common to the original image and the selected pixels of both the horizontal and vertical weighted convolutions;

discarding those pixels which are absent from the original image;

filtering those pixels which are common to the original image and to the original image and only one of the selected pixels of the horizontal and vertical weighted convolutions;

further retaining certain of the filtered pixels and discarding others in accordance with a predetermined filter matrix; and providing an output signal of the retained pixels which represents a thinned image.

2. The process recited in claim 1, including the steps of:

selecting the central pixel of each pixel string having an odd number of pixels;

selecting at least one of the pixels to the left or right of center of each pixel string having an even number of pixels.

3. The process recited in claim 1, including the steps of:

assigning values to the added pixels in accordance with the extent of their commonality with the original image and the selected pixels of the horizontal and vertical weighted convolutions;

forming a neighborhood for each pixel which is common to the original image or the original image and only one of the selected pixels of the horizontal and vertical weighted convolutions;

digitizing the pixels in the neighborhood by assigning a zero value to those pixels in the neighborhood having a certain value and a one to other pixels in the neighborhood having a different value;

forming two binary numbers from the digitized neighborhood;

providing a filter matrix with the binary numbers for determining whether a particular pixel is to be preserved as part of the thinned image.

4. The process recited in claim 3, including the step of:

applying the same filter matrix to certain of the preserved pixels a plurality of times to provide further image thinning.

5. The process recited in claim 4, wherein:
the same filter matrix is applied three times.

6. The process recited in claim 3, wherein:
each pixel neighborhood includes a 3×3 pixel matrix with the pixel being examined arranged at the center thereof.

7. The process recited in claim 1, including the steps of:

applying different filter matrices to pixels which are common to the original image and certain pixels which are common to the original image and only one of the selected pixels from the horizontal and vertical weighted convolution.

8. The process recited in claim 7, including the steps of:

applying a neighborhood to each pixel which is common to the original image and the selected pixels which are common to the original image and only one of the selected pixels from the horizontal and vertical weighted convolutions;

applying a first filter matrix to those pixels which are only common to the original image;

applying a second filter matrix to those pixels common to the original image and only one of the selected pixels from the horizontal and vertical weighted convolutions which have a pixel present in its neighborhood which is common to the original image and the selected pixels from both of the horizontal and vertical weighted convolutions;

applying a third filter matrix to those pixels common to the original image and only one of the selected pixels from the horizontal and vertical weighted convolutions which have a pixel present in its neighborhood which is common to the original image and only one of the selected pixels of the horizontal and vertical weighted convolutions and the absence of any pixels present in the neighborhood which are common to the original image and the selected pixels from both of the horizontal and vertical weighted convolutions;

applying a fourth filter matrix to those pixels common to the original image and only one of the selected pixels from the horizontal and vertical weighted convolutions which have only pixels present in its neighborhood which are absent from one or both of the selected pixels of the horizontal and vertical weighted convolutions.

9. The method recited in claim 8, wherein:
the fourth filter matrix is included within the first filter matrix.

10. The method recited in claim 1, including the step of:
applying the horizontal and vertical convolutions a plurality of times.

11. The method recited in claim 1, wherein:
the predetermined number of pixels which the horizontal strings of pixels are shifted for the horizontal convolution differs from the predetermined number of pixels which the vertical strings of pixels are shifted for the vertical convolution.

12. The process recited in claim 1, including the steps of:
applying an anorexic filter matrix to the thinned image to eliminate double line connections.

13. The process recited in claim 1, wherein:
the pixels are filtered a plurality of times.

14. A machine process for thinning an image, comprising the steps of:
defining an image in terms of a plurality of discrete picture elements (pixels);
performing a horizontal convolution with each horizontal pixel string by shifting it horizontally a predetermined number of pixels;
weighting each shifted horizontal pixel position of the horizontal strings by assigning a predetermined number thereto;
providing a horizontal descriptor matrix corresponding to certain of the shifted horizontal pixel positions of the horizontal strings;
selecting certain of the pixels of the weighted horizontally convolved pixel strings which correspond to the descriptors of the horizontal descriptor matrix;
performing a vertical convolution with each vertical pixel string by shifting it vertically a predetermined number of times;
weighting each shifted vertical pixel position of the vertical strings by assigning a predetermined number thereto;
providing a vertical descriptor matrix corresponding to certain of the shifted vertical pixel positions of the vertical strings;
selecting certain of the pixels of the weighted vertically convolved pixel strings which correspond to the descriptors of the vertical descriptor matrix;
forming in effect a composite image with the pixels of the original image, the selected pixels from the weighted horizontal convolution, and the selected pixels from the weighted vertical convolution;
preserving those pixels which are common to the original image and to the pixels selected from both the weighted horizontal and weighted vertical convolutions;
discarding those pixels which are absent from the original image;
filtering those pixels of the composite image which are common to the original image and to the original image and only one of the selected pixels from the horizontal and vertical weighted convolutions to preserve certain of the filtered pixels and discard others in accordance with a predetermined filter matrix; and
providing an output signal of the preserved pixels which represents a thinned image.

15. The process recited in claim 14, including the steps of:
assigning values to the pixels of the composite image in accordance with the extent of their commonality with the original image and the selected pixels of the horizontal and vertical weighted convolutions;
forming a neighborhood for each pixel of the composite image which is common to the original image or the original image and only one of the selected pixels of the horizontal and vertical weighted convolutions;
digitizing the pixels of the neighborhood by assigning a zero value to those pixels in the neighborhood having a certain value and a one to other pixels in the neighborhood having a different value;
providing a filter matrix from the neighborhoods for determining whether a particular pixel is to be preserved as part of the thinned image.

16. The process recited in claim 14, including the steps of:
selecting the central pixel of each pixel string having an odd number of pixels;
selecting at least one of the pixels to the left or right of center of each pixel string having an even number of pixels.

17. The process recited in claim 15, wherein:
each pixel neighborhood includes a 3×3 pixel matrix with the pixel being examined arranged at the center thereof.

18. The process recited in claim 14, including the step of:
applying an anorexic matrix filter to the resulting thinned image to eliminate double line connections.

19. The process recited in claim 14, including the step of:
repeating the filtering step a plurality of times after the horizontal and vertical convolutions to determine which pixels are to be preserved as part of the thinned image and which pixels are to be eliminated.

20. The process recited in claim 14, including the step of:
performing additional horizontal and vertical convolutions on the thinned image after filtering.

21. The process recited in claim 14, including the steps of:
applying different filter matrices to pixels which are common to the original image and certain pixels which are common to the original image and only one of the selected pixels from the horizontal and vertical weighted convolution.

22. The process recited in claim 21, including the steps of:

applying a neighborhood to each pixel which is common to the original image and the selected pixels which are common to the original image and only one of the selected pixels from the horizontal and vertical weighted convolutions;

applying a first filter matrix to those pixels which are only common to the original image;

applying a second filter matrix to those pixels common to the original image and only one of the selected pixels from the horizontal and vertical weighted convolutions which have a pixel present in its neighborhood which is common to the original image and the selected pixels from both of the horizontal and vertical weighted convolutions;

applying a third filter matrix to those pixels common to the original image and only one of the selected pixels from the horizontal and vertical weighted convolutions which have a pixel present in its neighborhood which is common to the original image and only one of the selected pixels of the horizontal and vertical weighted convolutions and the absence of any pixels present in the neighborhood which are common to the original image and the selected pixels from both of the horizontal and vertical weighted convolutions;

applying a fourth filter matrix to those pixels common to the original image and only one of the selected pixels from the horizontal and vertical weighted convolutions which have only pixels present in its neighborhood which are absent from one or both of the selected pixels of the horizontal and vertical weighted convolutions.

23. The method recited in claim 22, wherein:

the fourth filter matrix is included within the first filter matrix.

24. The method recited in claim 14, including the step of:

applying the horizontal and vertical convolutions a plurality of times.

25. The method recited in claim 14, wherein:

the predetermined number of pixels which the horizontal strings of pixels are shifted for the horizontal convolution differs from the predetermined number of pixels which the vertical strings of pixels are shifted for the vertical convolution.

* * * * *